(12) United States Patent
Kim et al.

(10) Patent No.: US 11,535,006 B2
(45) Date of Patent: Dec. 27, 2022

(54) NANOCOMPOSITE SURFACES WITH ELECTRICALLY SWITCHABLE ADHESION

(71) Applicant: Massachusetts Institute of Technology, Cambridge, MA (US)

(72) Inventors: Sanha Kim, Daegeon (KR); Anastasios John Hart, Waban, MA (US); Kevin Turner, Wayne, PA (US); Yijie Jiang, Corinth, TX (US)

(73) Assignee: Massachusetts Institute of Technology, Cambridge, MA (US)

( * ) Notice: Subject to any disclaimer, the term of this patent is extended or adjusted under 35 U.S.C. 154(b) by 531 days.

(21) Appl. No.: 16/475,533

(22) PCT Filed: Jan. 5, 2018

(86) PCT No.: PCT/US2018/012510
§ 371 (c)(1),
(2) Date: Jul. 2, 2019

(87) PCT Pub. No.: WO2018/129272
PCT Pub. Date: Jul. 12, 2018

(65) Prior Publication Data
US 2020/0254718 A1    Aug. 13, 2020

Related U.S. Application Data

(60) Provisional application No. 62/443,259, filed on Jan. 6, 2017.

(51) Int. Cl.
*B32B 5/26* (2006.01)
*B32B 5/12* (2006.01)
(Continued)

(52) U.S. Cl.
CPC .................. *B32B 5/26* (2013.01); *B32B 5/12* (2013.01); *B32B 9/007* (2013.01); *B32B 18/00* (2013.01);
(Continued)

(58) Field of Classification Search
None
See application file for complete search history.

(56) References Cited

U.S. PATENT DOCUMENTS 6,364,941 B2    4/2002    Liu et al.
7,551,419 B2    6/2009    Pelrine et al.
(Continued)

OTHER PUBLICATIONS

Bicchi, A, "Hands for dexterous manupulation and robust grasping: a difficult road toward simplicity," IEEE Transactions on Robotics and Automation, vol. 16, pp. 652-662, 2000 (11 pages).
(Continued)

*Primary Examiner* — Chinessa T. Golden
(74) *Attorney, Agent, or Firm* — Barnes & Thornburg LLP

(57) ABSTRACT

An apparatus for manipulating an object includes a substrate, an electrically conductive layer disposed on the substrate, and a porous medium comprising an electrically conductive material. The apparatus also includes a dielectric layer conformally disposed on the porous medium to insulate the porous medium from the object during use. The porosity of the porous medium is about 90% or greater. The adhesive strength of the porous medium is about 1 kPa or lower, and the modulus of the porous medium is about 1 GPa or lower.

40 Claims, 17 Drawing Sheets

(51) Int. Cl.
   *B32B 9/00*     (2006.01)
   *B32B 18/00*    (2006.01)
   *B32B 7/025*    (2019.01)
(52) U.S. Cl.
   CPC ......... *B32B 7/025* (2019.01); *B32B 2262/106* (2013.01); *B32B 2264/108* (2013.01); *B32B 2305/026* (2013.01); *B32B 2307/202* (2013.01); *B32B 2307/204* (2013.01); *B32B 2307/206* (2013.01); *B32B 2313/04* (2013.01)

(56) References Cited

U.S. PATENT DOCUMENTS

2011/0266665 A1    11/2011   Gowda et al.
2014/0287641 A1    9/2014    Steiner, III

OTHER PUBLICATIONS

Dadkhah, M et al., "A self-aligning gripper using an electrostatic/gecko-like adhesive," IEEE/RSJ International Conference on Intelligent Robots and Systems (IROS), Oct. 2016, Daejeon, Korea (6 pages).

Fantoni, G et al., "Grasping devices and methods in automated production processes," CIRP Annals—Manufacturing Technology, vol. 63, pp. 679-701, 2014 (23 pages).

Hawkes, E. W. et al., "Dynamic surface grasping with directional adhesion," 2013 IEEE/RSJ International Conferenfce on Intelligent Robots and Systems (IROS), Nov. 3-7, 2013, Tokyo, Japan (7 pages).

Hesselbach, J et al., "Centering electrostatic microgripper and magazines for microassembly tasks," Proceedings of SPIE 4568, Microbotics and Microassembly III, 2001 (9 pages).

International Search Report and Written Opinion for Application No. PCT/US18/12510 dated Mar. 12, 2018 (14 pages).

Kim, S et al., "Microstructured elastomeric surfaces with reversible adhesion and examples of their use in deterministic assembly by transfer printing," Proceedings of the National Academy of Sciences (PNAS), vol. 107, No. 40, pp. 17095-17100, 2010 (6 pages).

Krupenkin, et al., "Reversible Wetting-Dewetting Transitions on Electrically Tunable Superhydrophobic Nanostrucutred Surfaces," Langmuir, vol. 23, Issue 18, pp. 9128-9133, 2007 (6 pages).

Lin, et al., "Mechanically tunable dry adhesive from wrinkled elastomers," Soft Matter, vol. 4, Issue 9, pp. 1830-1835, Jun. 2008 (6 pages).

Meitl, M. A. et al., "Transfer printing by kinetic control of adhesion to an elastomeric stamp," Nature Materials, vol. 5, pp. 33-38, 2005 (6 pages).

Murphy, M. P. et al., "Gecko-inspired directional and controllable adhesion," Small, vol. 5, Issue 2, pp. 170-175, 2009 (6 pages).

Sahay, R et al., "A state-of-the-art review and analysis on the design of dry adhesion materials for applications such as climbing micro-robots," RSC Advances, vol. 5, Issue 63, pp. 50821-50832, 2015 (12 pages).

Shintake, J et al., "Versatile soft grippers with intrinsic electroadhesion based on multifunctional polymer actuators," Advanced Materials, vol. 28, Issue 2, pp. 231-238, 2016 (8 pages).

Carlson, A et al., "Transfer printing techniques for materials assembly and micro/nanodevice fabrication," Advanced Materials, vol. 24, pp. 5284-5318, 2012 (35 pages).

Ciocarlie, M et al., "The Velo gripper: a versatile single-actuator design for enveloping parallel and finger tip grasps," The International Journal of Robotics Research, vol. 33, No. 5, pp. 642-656, 2014 (15 pages).

Guo, J et al., "Toward adaptive and intelligent electroadhesives for robotic material handling," IEEE Robotics and Automation Letters, vol. 2, Issue 2, pp. 538-545, 2017 (9 pages).

Molhave, K et al., "Pick-and-place nanomanupulation using microfabricated grippers," Nanotechnology, vol. 17, pp. 2434-2441, 2006 (9 pages).

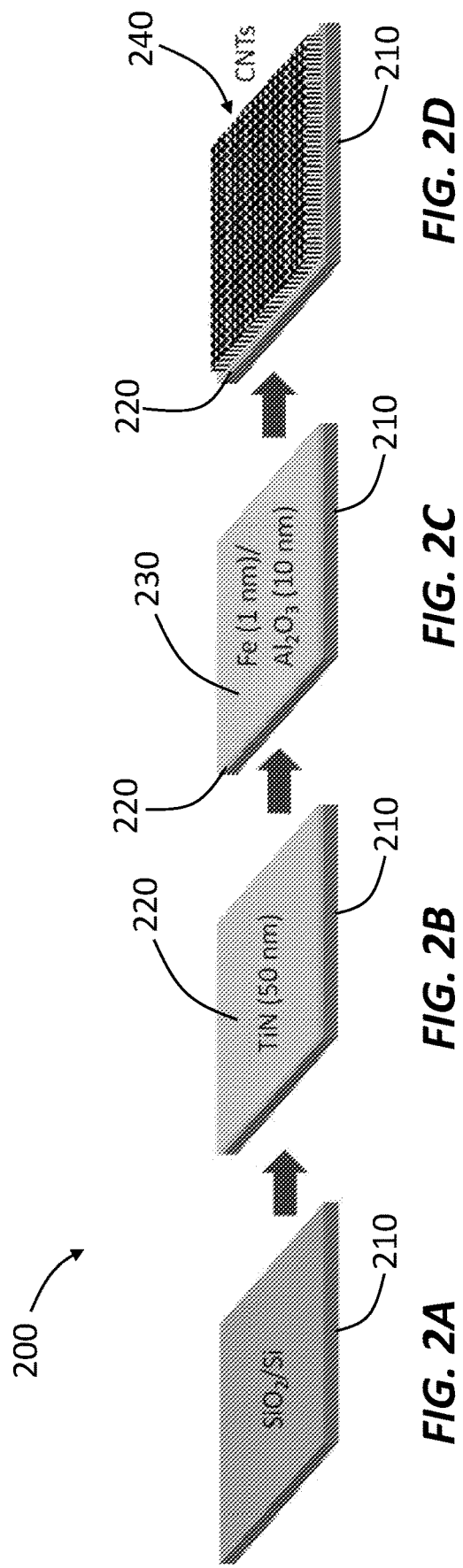

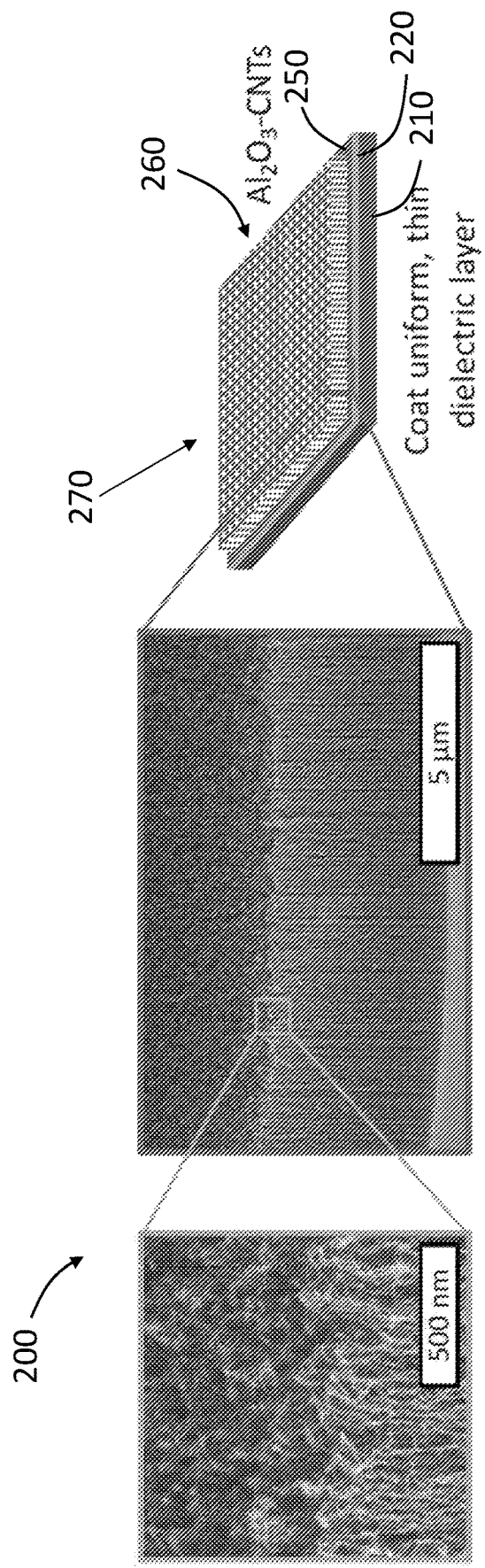

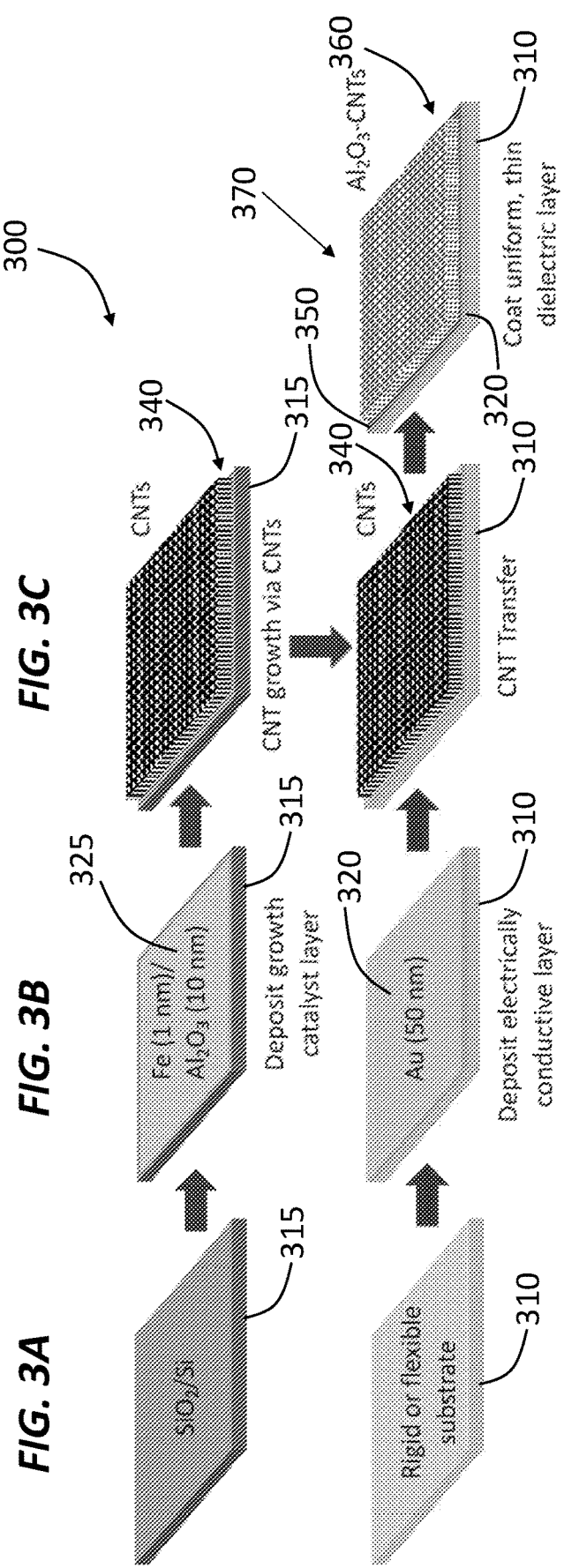

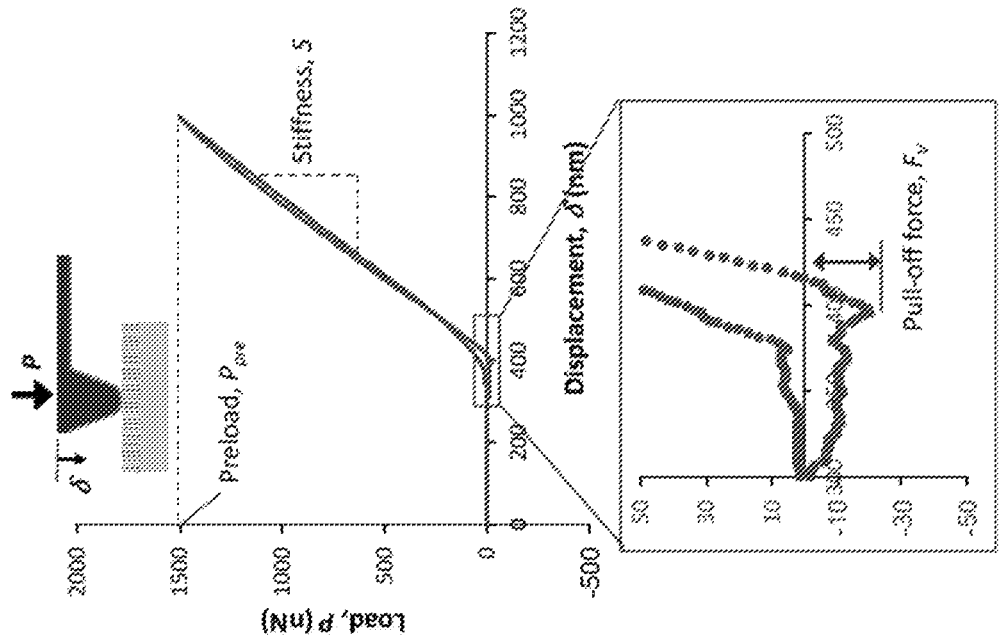
FIG. 4B
FIG. 4C
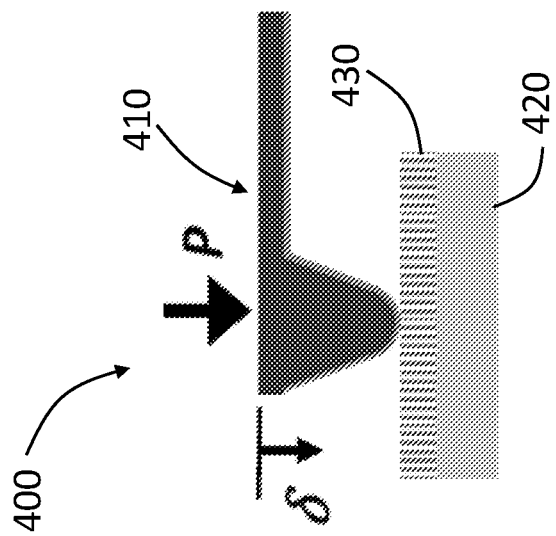
FIG. 4A

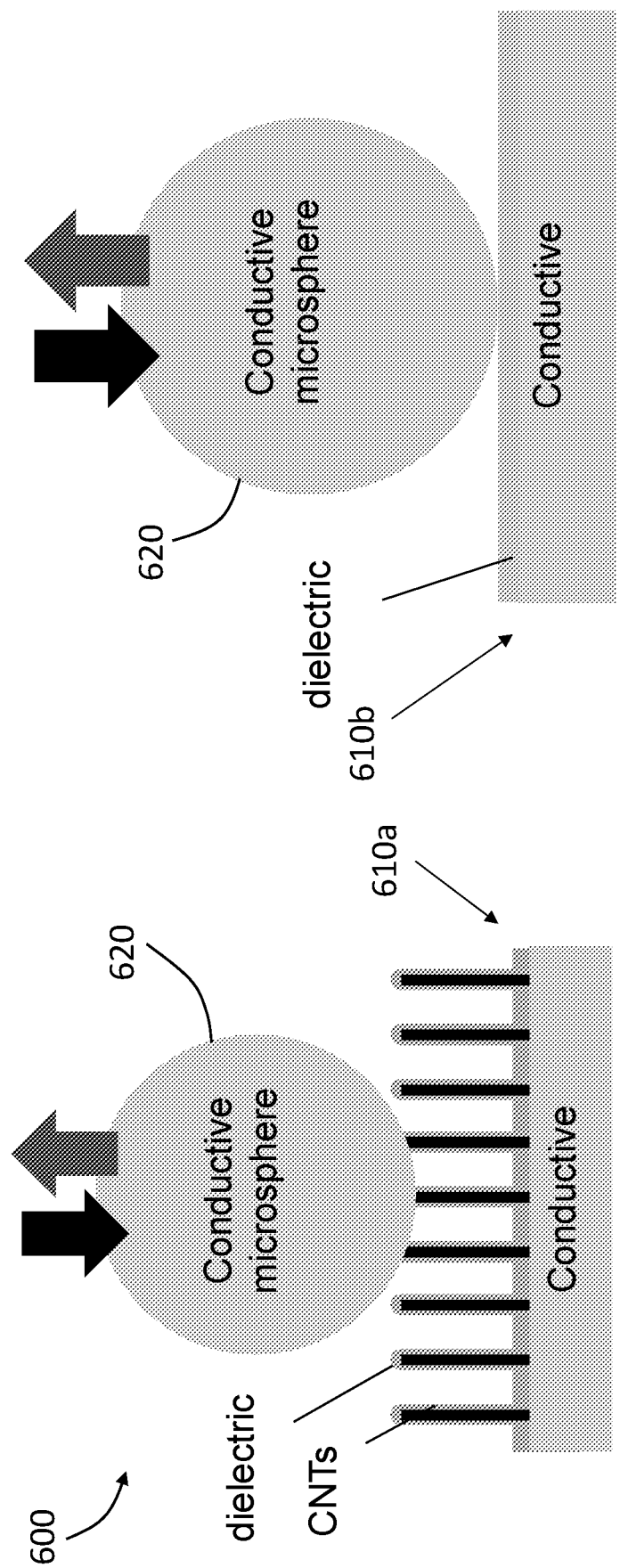

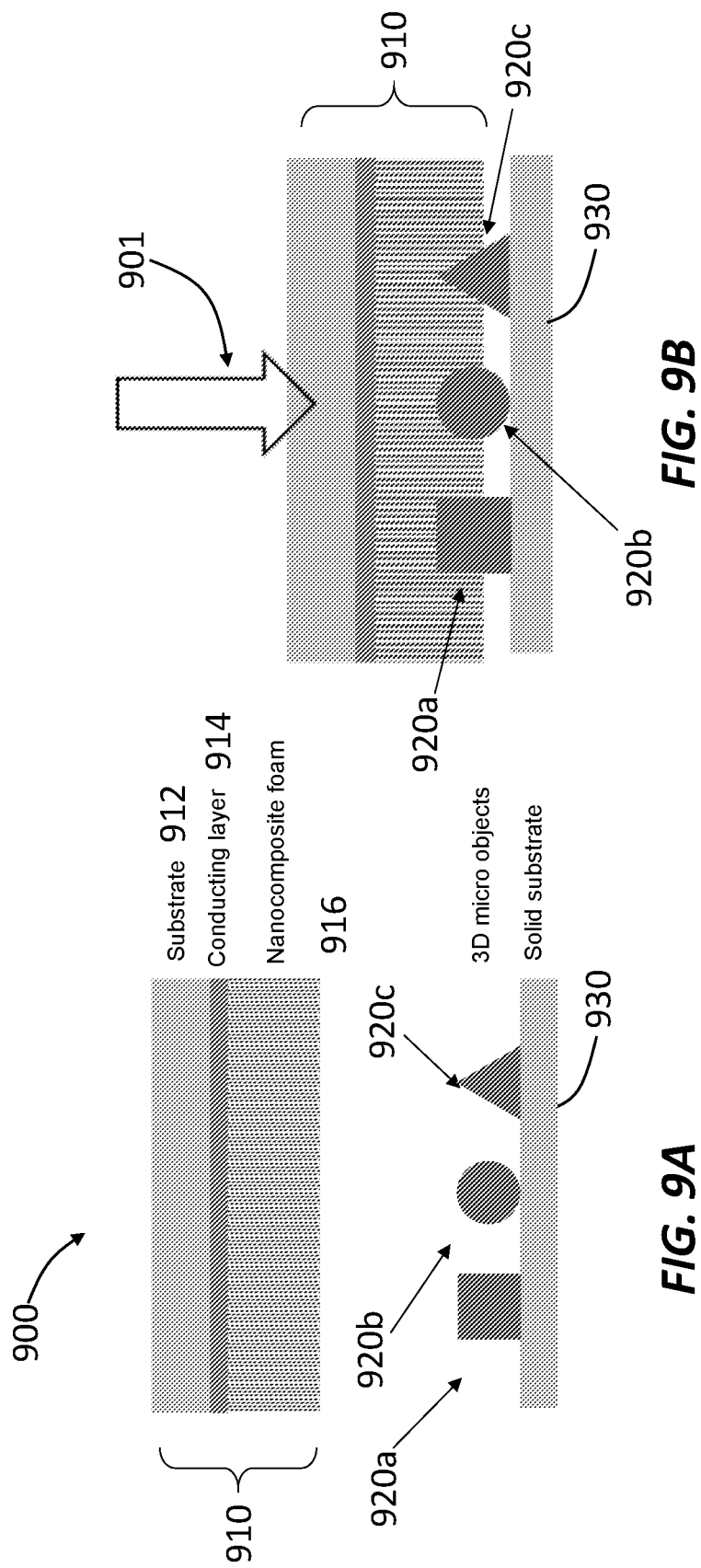

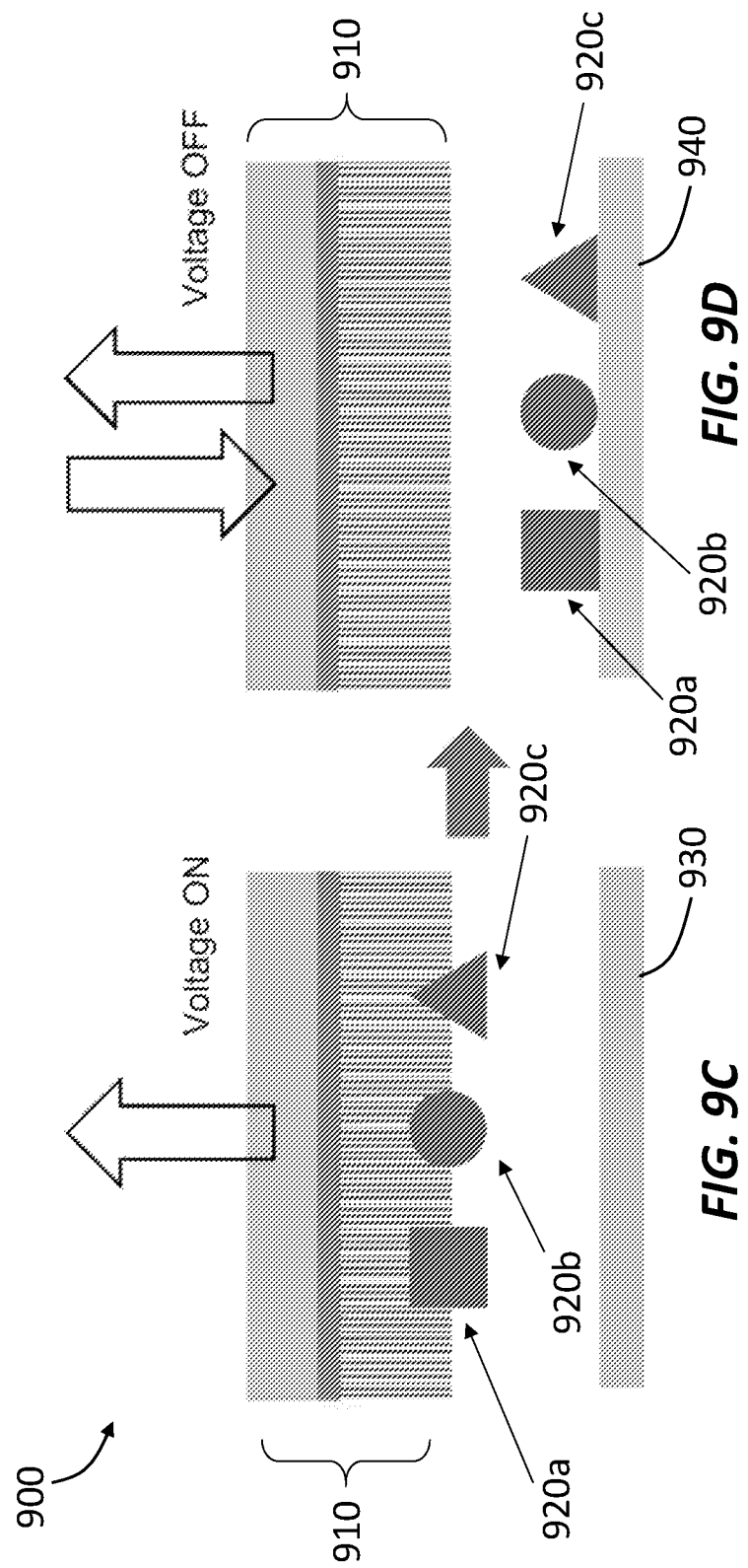

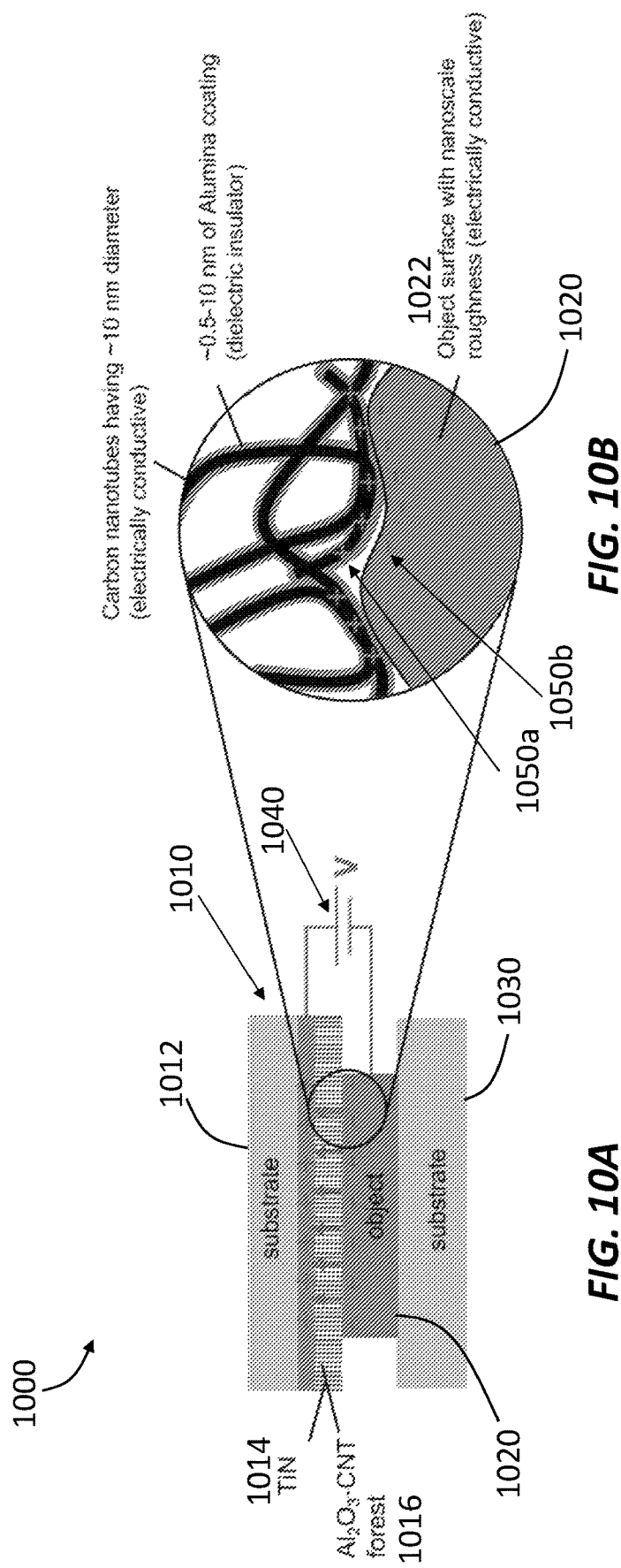

NANOCOMPOSITE SURFACES WITH ELECTRICALLY SWITCHABLE ADHESION

CROSS-REFERENCE TO RELATED APPLICATIONS

This application is a U.S. national stage filing from International Application Number PCT/US18/12510, filed Jan. 5, 2018, and entitled "NANOCOMPOSITE SURFACES WITH ELECTRICALLY SWITCHABLE ADHESION," which claims a priority benefit of U.S. Provisional Patent Application No. 62/443,259, filed on Jan. 6, 2017, and entitled "COMPLIANT NANOSTRUCTURED SURFACES WITH ELECTRICALLY SWITCHABLE ADHESION," both applications of which are incorporated herein by reference in their entireties.

GOVERNMENT SUPPORT

This invention was made with Government support under Grant Nos. CMMI-1463181 and CMMI-1463344 awarded by the National Science Foundation. The Government has certain rights in the invention.

BACKGROUND

In many manufacturing processes, pick-and-place operations are often used in handling parts, components, and products. The most common approach for pick-and-place operations is to use mechanical grippers having multi-fingered robotic hands and vacuum-based systems, also referred to as the grasping approach. However, it is usually challenging to use the same gripper to handle objects having different sizes, shapes, orientations, and brittleness. In addition, mechanical grippers typically involve high precision control of the robotic hand, especially in electronics manufacturing where the products are fabricated and assembled in microscales and nanoscales.

Another approach for pick-and-place operations uses devices with tunable surface adhesion. This approach is attractive for pick-and-place operation in small scale because it can achieve high precision with less complicated control compared to the grippers. Viscoelasticity is usually used to achieve tunable surface adhesion. In this technique, the adhesion of elastomers can be tuned by controlling the contact/detach speed between the device and the target object. Elastomers can also have good mechanical compliance, thereby allowing soft contact with the object without damaging the object surface. However, the rate dependency of adhesion control often limits the operation speed and eventually the production throughput. Moreover, the lowest adhesion of elastomers may still be too high to release objects onto some desired substrates, in which case complicated surface structures or additional chemical treatments are employed to decrease the adhesion.

SUMMARY

Embodiments of the present technology generally relate to methods, apparatus, and systems for object manipulation via electrically controlled adhesion. In one example, an apparatus for manipulating an object includes a substrate, an electrically conductive layer disposed on the substrate, and a porous medium including an electrically conductive material. The apparatus also includes a dielectric layer conformally disposed on the porous medium to insulate the porous medium from the object during use. The porosity of the porous medium is about 90% or greater, the adhesive strength of the porous medium is about 1 kPa or lower, and the modulus of the porous medium is about 1 GPa or lower.

In another example, a method of manipulating an object includes contacting a top section of a dielectric-coated porous medium against the object. The dielectric-coated porous medium includes a conductive porous medium conformally coated with a dielectric layer. The method also includes applying a voltage on the dielectric-coated porous medium so as to adhere the object to the dielectric-coated porous medium based at least in part on electrostatic force. The method also includes removing the voltage so as to release the object from the dielectric-coated porous medium onto a target substrate.

In yet another example, an apparatus for manipulating an object includes a substrate, a conductive layer including TiN and disposed on the substrate, and a group of vertically aligned carbon nanotubes disposed on the conductive layer and having a porosity of about 90% or greater at a top section of the carbon nanotubes. Each carbon nanotube has a diameter of about 1 nm to about 100 nm. The apparatus also includes a dielectric layer conformally disposed on the vertically aligned carbon nanotubes and configured to insulate the vertically aligned carbon nanotubes from the object during use. The dielectric layer has a thickness of about 10 nm or less. The apparatus further includes a voltage source electrically coupled to the conductive layer and configured to generate an electrostatic force between the vertically aligned carbon nanotubes and the object during use. The modulus of the vertically aligned carbon nanotubes is about 2 MPa to about 200 MPa, and the adhesive strength is adjustable between about 0.5 kPa and about 50 kPa when an voltage applied on the plurality of vertically aligned carbon nanotubes is between about 0 V and about 30 V.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 2A-2G illustrate a method 200 of fabricating a nanocomposite foamed surface that can be used in the apparatus shown in FIGS. 1A and 1B for object manipulation.

FIGS. 3A-3G illustrate a method of fabricating a nanocomposite foamed surface that includes CNTs transferred from a separate substrate and can be used in the apparatus shown in FIGS. 1A and 1B for object manipulation.

FIG. 4A shows a schematic of a system to characterize the mechanical compliance and adhesion of a forest of CNTs that can be used in nanoporous electrostatic adhesive tools.

FIGS. 4B and 4C show measured load force versus displacement (surface stiffness) and pull-off force (surface adhesion) of an alumina coated CNT forest.

FIGS. 6A-6C illustrate the effects of CNT forests on the surface moduli and pull-off forces in electrostatic tools.

FIGS. 9A-9D illustrate a method of object manipulation using a nanoporous electrostatic tool.

FIGS. 10A and 10B illustrate a method of manipulating a conductive object using a nanoporous electrostatic tool.

DETAILED DESCRIPTION

Nanocomposite Foamed Surfaces for Object Manipulation

Figure 1A:
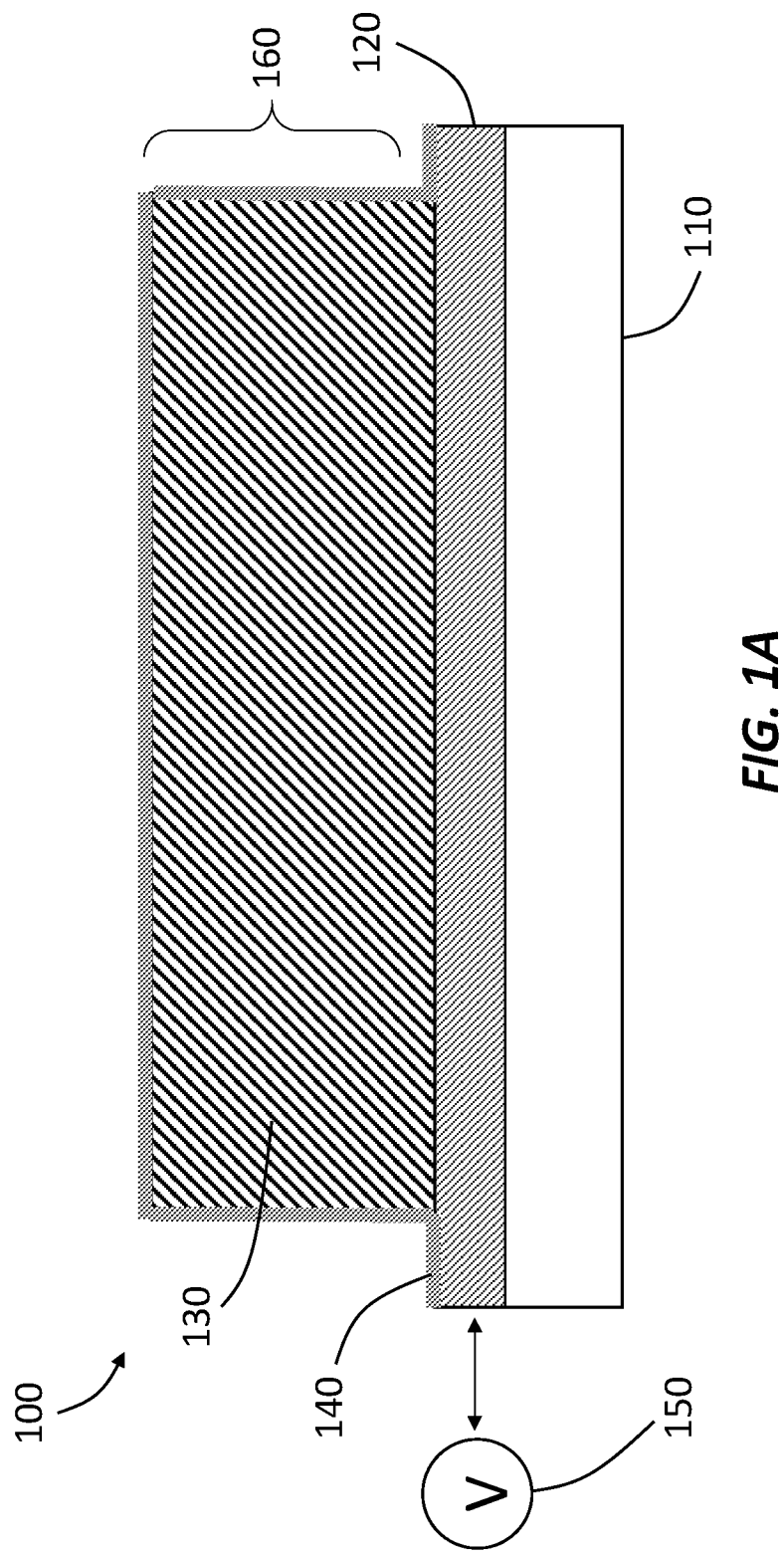
FIGS. 1A and 1B show schematics of apparatus for object manipulation using electrically switchable adhesion.

The drawbacks of elastomer-based and velocity controlled pick-and-place operations (e.g., low adhesion on/off ratio and rate-dependent adhesion control) can be addressed by electrostatic adhesion, i.e. adhesion based on electrostatic force. In one implementation discussed in detail below, an example apparatus for object manipulation (also referred to herein as a "nanoporous electrostatic tool" or simply "tool") is configured to provide for tunable adhesion by inducing charge difference between the tool and the object, or between different areas within the tool (e.g., adjacent electrodes embedded in the tool).

In some examples of adhesion facilitated by electrostatic force, relatively stiff and planar electrostatic chucks can be used to grip semiconductor wafers in process tools. Electrostatic gripping tools generally include an electrically conductive (mostly metal) surface covered with a thin dielectric layer (e.g., ceramic or polymer). In one example, the conductive surface has a planar shape and can be mechanically stiff. This configuration can be used to handle objects that also have planar surfaces. However, the planar configuration may have less satisfactory contact against objects with rough surface or having complex shapes and may also cause damages on delicate objects when compressed with high pressure. In addition, solid surfaces usually have a low on/off adhesion ratio as the mechanical adhesion is comparable to the maximum electrostatic adhesion.

To improve the surface compliance and the on/off adhesion ratio of electrostatic adhesive tools, apparatus and methods described herein employ compliant low-adhesive nanostructured foam-like composite surfaces (also referred to as "nanostructure surfaces") with electrically switchable adhesion. In this approach, nanoporous and conductive medium is coated with a dielectric layer to form a contact section of a manipulation tool. The nanoporous, conductive medium has mechanical compliance that allows conformal contact between the tool and the object to be manipulated. In addition, the nanoporous, conductive medium also allows low mechanical adhesion when there are no induced electrostatic charges. The dielectric layer electrically insulates the conductive fibers from the object and allows the creation of an electrostatic force between the tool and the object in response to an applied voltage (e.g. on the porous medium). The electrostatic force facilitates the adhesion of the object to the tool. The release of the object on target location is then realized by removing the applied voltage (or a portion of the applied voltage).

Compared with existing pick-and-place technology, the approach described herein can have multiple advantages. First, the mechanical compliance of the conductive nanoporous medium can be employed to manipulate objects having various shapes, i.e. one tool can be used to manipulate different objects. In addition, the mechanical compliance can be readily adjusted over orders of magnitude during manufacturing (e.g., by adjusting the number of fibers per area, i.e., fiber density, or other parameters of the porous medium). Furthermore, the magnitude of the adhesion force can be controlled by the applied voltage within a broad range, thereby allowing manipulation of objects having different weights and surface energies. For example, the nanostructure surfaces can be used to pick up an object or adhere to another surface by increasing the adhesion at high voltage and place the object or detach from the surface by decreasing the adhesion at low voltage. The extremely low surface adhesion when voltage is off accompanied by the capability of electrically tunable adhesion with high on/off ratio is particularly of interest when manipulating micro- or nanometer sized objects, as surface forces dominates the gravity force at such length scales.

FIG. 1A show a schematic of apparatus 100 with electrically switchable adhesion. The apparatus 100 includes a substrate 110 and a conductive layer 120 disposed on the substrate 110. A conductive porous medium 130 is disposed on the conductive layer 120 to form a nanoporous and electrically conductive surface, which can be mechanically compliant to have conformal contact with an object to be manipulated (also referred to herein as a "target object"). A dielectric layer 140 is conformally coated on the conductive porous medium 130, as well as the portion of the top surface of the conducive layer 120 not covered by the porous medium 130. The dielectric layer 140 can electrically insulate the conductive porous medium 130 from the target object during use (e.g., when a voltage is applied on the conductive porous medium 130).

The combination of the conductive porous medium 130 and the dielectric layer 140 is also referred to as a dielectric-coated porous medium 160 or a nanocomposite foamed surface 160.

In operation, the conductive layer 120 can be connected to a voltage source 150 (e.g., a power supply), which applies a voltage between the conductive porous medium 130 and the target object. Due to the insulation of the dielectric layer 140, electrical charges do not freely move between the microstructures 130 and the target object. Instead, electrical charges having opposite polarities accumulate near the interface between the conductive porous medium 130 and the target object, thereby creating an electrostatic force to attract the target object to the apparatus 100. The amplitude of the electrostatic force depends on the amplitude of the applied voltage. Therefore, by adjusting the voltage, one can control the apparatus 100 to manipulate objects having different weights.

Figure 1B:
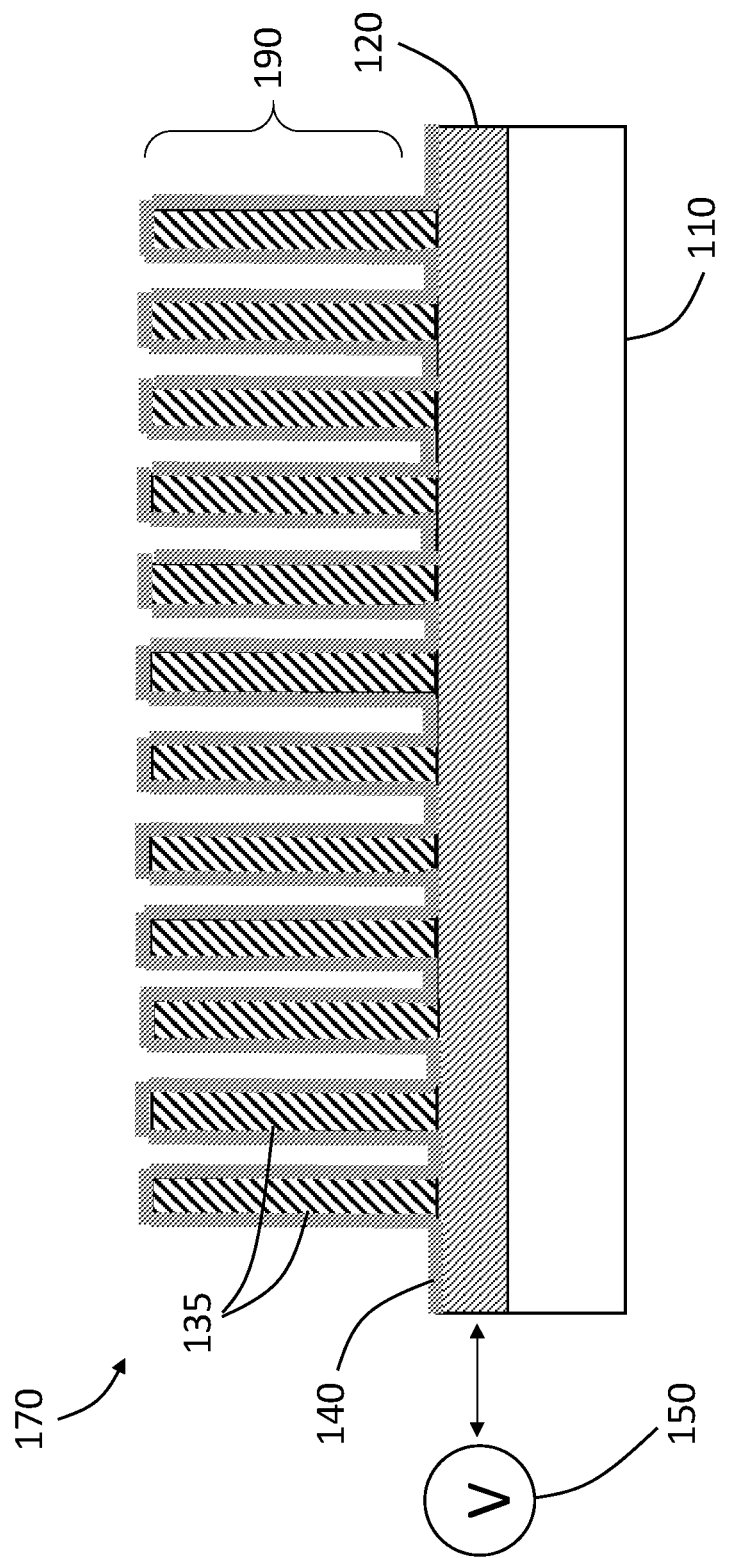

FIG. 1B shows a schematic of an apparatus 170 including a collection of conductive microstructures 135 (also referred to as foamed microstructures 135) to form the porous conductive medium 130. Each microstructure in the collection of microstructures 135 can have micrometer dimensions and is disposed on the conductive layer 120. The dielectric layer 140 is conformally disposed on the conductive microstructures 135 (including side walls) to form a dielectric-coated nanoporous medium 190 (also referred to as a nanocomposite foamed microstructure 190). The operation of the apparatus 170 can be substantially similar to the operation of the apparatus 100.

The substrate 110 in the apparatus 100 can serve as a holder to hold the conductive porous medium 130. In one example, the substrate 110 can include a metal, in which case the conductive layer 120 can be optional. In another example, the substrate 110 can include a ceramic. In yet another example, the substrate 110 can include a polymer.

In one example, the substrate 110 can be rigid, while the conductive porous medium 130 is mechanically compliant, thereby allowing conformal contact between the apparatus 100 (e.g., the top section of the conductive porous medium 130) and the target object without buckling or yielding of the microscale features on the apparatus 100. The top section can include, for example, the top 50% or less of the conductive porous medium 130. The conformal contact can also increase the contact area between the apparatus 100 and the target object, thereby increasing the adhesion arising from the electrostatic force. In some examples, the modulus of the conductive porous medium 130 can be about 2 MPa to about 200 MPa under compression (e.g., about 2 MPa, about 3 MPa, about 5 MPa, 10 MPa, about 20 MPa, about 30 MPa, about 50 MPa, about 100 MPa, about 150 MPa, or about 200 MPa, including any values and sub ranges in between). In some examples, the dielectric-coated porous medium 160 can have similar modulus.

In another example, the substrate 110 can be flexible (e.g., bendable or deformable) to provide more options for irregular/non-planar target object shapes. In this instance, the apparatus 100 can be employed to manipulate objects having non-planar surfaces, such as a spherical surface, a cylindrical surface, or an elliptical surface, among others, by deforming the substrate 110 to fit the shape of the non-planar surfaces. The non-planar surface can further include surface irregularities (e.g., surface roughness or any other smaller scale irregularities, such as irregularities on micrometers scale or less) that can be addressed by the compliance of the conductive microstructures 130. In other words, the flexible substrate 110 can accommodate irregularities on a coarse scale, and the compliance of the conductive porous medium 130 can accommodate irregularities on a fine scale.

The conductive layer 120 in the apparatus 100 functions as an electrode to apply voltages on the conductive porous medium 130. The conductive layer 120 can include a variety of appropriate conductive materials, such as titanium nitride, iron, silver, and gold, among others.

In one example, the conductive layer 120 includes one electrode shared by all the conductive porous medium 130. In another example, the conductive layer 120 can include a first section underneath a first subset of microstructures and a second section underneath a second subset of microstructures. In this instance, a voltage can be applied between the first subset of microstructures and the second subset of microstructures so as to create the electrostatic force (see, e.g., FIG. 12).

In yet another example, the conductive layer 120 can include multiple electrodes, each of which is underneath a section of the conductive porous medium 130 (e.g., one microstructure or a group of microstructures 135) so as to allow individual control of section of the conductive porous medium 130 (e.g., each microstructure or each group of microstructures 135). In this instance, the apparatus 100 can be used to manipulate multiple target objects. For example, the apparatus 100 can pick up one target object by applying a voltage to one subset of microstructures 135 and pick up another target object by applying a voltage to another subset of the microstructures 135. Similarly, the apparatus 100 can release one target object by removing the voltage applied on one subset of microstructures 135 and release another target object by removing the voltage applied on another subset of the microstructures 135.

The conductive porous medium 130 can include various types of media and structures to achieve the desired pore size and mechanical compliance, among others. In one example, conductive porous medium 130 can be composed of nanofeatures which include electrically conductive fibers, such as vertically grown nanowires or filaments (e.g., silver). In another example, the conductive porous medium 130 can include forests of carbon nanotubes (e.g., single-walled carbon nanotubes or multi-walled carbon nanotubes). The carbon nanotubes can be vertically aligned or substantially vertically aligned and extending upward from the conductive layer 120.

In yet another example, the conductive porous medium 130 can be made from casting a film of micrometer or nanometer sized particles, compacting them to create at least a partially fused or sintered assembly that have nanopores defined between them. In yet another example, conductive porous medium 130 can include a nanocarbon foam or a cast aerogel. Additionally, a nanoporous surface for a nanoporous stamp may be made from three-dimensional (3D) printing via photo-polymerization, which can create structured features of nanoscale dimensions.

In some examples, in which the conductive porous medium 130 includes carbon nanotubes, the diameter of carbon nanotubes in conductive porous medium 130 can be about 1 nm to about 100 nm (e.g., about 1 nm, about 2 nm, about 3 nm, about 5 nm, about 10 nm, about 20 nm, about 30 nm, about 40 nm, about 50 nm, or about 100 nm, including any values and sub ranges in between).

In one example, all the nanotubes in the conductive porous medium 130 or the microstructures 135 can have approximately the same height. For example, the height (or length) can be about 200 nm to about 1 mm (e.g., about 200 nm, about 500 nm, about 1 μm, about 2 μm, about 5 μm, about 10 μm, about 20 μm, about 50 μm, about 100 μm, about 200 μm, about 500 μm, or about 1 mm, including any values and sub ranges in between).

In another example, the height (or length) of the nanotubes can have a variance of about 10 nm to about 100 μm (e.g., about 10 nm, about 20 nm, about 30 nm, about 50 nm, about 100 nm, about 200 nm, about 300 nm, about 500 nm, about 1 μm, about 2 μm, about 3 μm, about 5 μm, about 10 μm, about 20 μm, about 30 μm, about 50 μm, or about 100 μm, including any values and sub ranges in between). This height variance can create roughness of the free surface in the top section where the target object can be more conformally secured. In some examples, the height variance of the nanotubes can be about 1% to about 20% of the average height of the nanotubes (e.g., about 1%, about 2%, about 3%, about 5%, about 10%, about 15%, or about 20%, including any values and sub ranges in between).

In one example, the conductive porous medium 130 can form a regular pattern, such as a two-dimensional (2D) matrix. In one aspect of this example, the nanocomposite foamed microstructures 190 can include a 2D array of pixels, each of which includes one or a group of microstructures. In this instance, the conductive layer 120 can include an array of electrodes, each of which is disposed underneath a corresponding pixel (e.g., one microstructure or a group of microstructures). Therefore, each microstructure (or each group of microstructures) can be individually controlled to load and release target objects as described herein.

In another example, the conductive porous medium 130 can form a pre-determined pattern adapted to manipulate a particular target object. For example, a semiconductor device may have ridges that can be used to manipulate the device, and the array of nanocomposite foamed microstructures 190 can form a pattern similar to the pattern of the ridges to manipulate the device by contacting the ridges. In this instance, all the microstructures 130 can share the same conductive layer 120 as the electrode to apply the voltage.

The dielectric-coated porous medium 160 (including the nanocomposite foamed microstructures 190) can be characterized by the size of the pores (also referred to as the pore size). The pore size can be measured as the average distance between adjacent microstructures. Alternatively, the pore size can be measured as the average void size or diameter defined in the dielectric-coated porous medium 160 (including the a nanocomposite foamed microstructure 190). Depending on the implementation, the pore size can be less than 10 µm (e.g., about 10 µm, about 5 µm, about 3 µm, about 2 µm, about 1 µm, about 500 nm, about 400 nm, about 300 nm, about 200 nm, about 100 nm, about 50 nm, about 25 nm, about 20 nm, about 15 nm, about 10 nm or less, including any values and sub ranges in between).

The pore size can be smaller than the size of the target object (also referred to as object size herein). The object size can be defined as the lateral dimension (e.g. along directions parallel to the substrate 110) of the target object. For example, the ratio of the pore size to the object size can be about 0.9 to about $10^{-4}$ (e.g., about 0.9, about 0.5, about 0.2, about 0.1, about 0.05, about 0.01, about $5\times10^{-3}$, about $10^{-3}$, about $5\times10^{-4}$, or about $10^{-4}$, including any values and sub ranges in between).

The porosity (also referred to as the void fraction) of the conductive porous medium 130 can be about 10% to about 99% (e.g., about 10%, about 20%, about 30%, about 40%, about 50%, about 60%, about 70%, about 80%, about 90%, about 95%, about 97%, about 98%, or about 99%, including any values and sub ranges in between). The dielectric layer 140 usually decreases the porosity of the nanoporous structure. In some examples, the above porosities can be achieved after taking into account the dielectric layer 140.

The thickness of the dielectric layer 140 can depend on at least two factors. On the one hand, a thinner dielectric layer 140 allows a stronger electrostatic force to be built between the apparatus 100 and the target object. On the other hand, however, a thicker dielectric layer 140 can ensure that conductive porous medium 130 is well insulated. In some examples, the thickness of the dielectric layer 140 can be about 0.1 nm to about 50 nm (e.g., about 0.1 nm, about 0.2 nm, about 0.3 nm, about 0.5 nm, about 1 nm, about 2 nm, about 3 nm, about 5 nm, about 10 nm, about 15 nm, about 20 nm, or about 50 nm including any values and sub ranges in between).

Various materials can be used for the dielectric layer 140. For example, the dielectric layer 140 can include polymer or ceramic (e.g., $Al_2O_3$). The surface wettability or adhesive energy of the apparatus 100 can, in some embodiments, be tuned or configured by selecting appropriate material(s) for the dielectric layer 140. For example, a polymer coating can be applied to or disposed on the nanotubes, and the polymer coating forms bonds between at least a portion of the nanotubes. One or more polymers can be selected based on the particular implementation where utilized, and can include one or more of the following: a fluoropolymer, a polyacrylate, a polyfluoroacrylate, and/or a polyperfluorodecylacrylate. Additional exemplary polymers can include, depending on the embodiment and by way of non-limiting example: polydimethylsiloxane (PDMS); poly(methyl methacrylate) (PMMA); (dimethylaminomethyl)-styrene (DMAMS); (2-hydroxyethyl) methacrylate (HEMA);1-vinyl-2-pyrrolidone (VP); ethylene glycol diacrylate (EGDA); trivinyltrimethylcyclotrisiloxane (V3D3); methacrylic acid (MAA); ethlacrylate; and/or glycidyl methacrylate (GMA).

Further examples of materials that can be used for the dielectric layer 140 include poly-perfluorodecylacrylate, or p(PFDA). The PFDA monomer diffuses into the porous medium in the vapor phase and results in a conformal coating. In this example, the initiated chemical vapor deposition (iCVD) can be used to conformally coat the conductive porous medium 130.

Fabrications of Nanocomposite Foamed Surfaces

FIGS. 2A-2G illustrate a method 200 of fabricating a nanocomposite foamed surface that can be used in the apparatus shown in FIGS. 1A and 1B for object manipulation. The method 200 starts with a substrate 210 as shown in FIG. 2A. Various materials can be used for the substrate 210. In one example, the substrate 210 can include silicon, such as a 4" (100) silicon wafer coated with 300 nm of thermally grown Sift. In another example, the substrate 210 can include gold, quartz, glass, copper, aluminum, graphite, aluminum oxide, and the like, and/or mixtures thereof. In yet another example, the substrate 210 can include a ceramic or a polymer.

A conductive layer 220 is then formed on the substrate 210 via, for example, chemical vapor deposition (CVD) or physical vapor deposition (PVD) as shown in FIG. 2B. The conductive layer 220 can include any appropriate conductive material, such as TiN. In some examples, the thickness of the conductive layer 220 can be about 20 nm or greater (e.g., about 20 nm, about 30 nm, about 50 nm, about 100 nm, about 150 nm, or greater). In one example, the substrate 210 can include a metal, in which case the conductive layer 220 can be optional.

FIG. 2C shows that a catalyst layer 230 is formed on the conductive layer 220. The catalyst layer 230 can further include a first sublayer of Fe disposed on a second sublayer of $Al_2O_3$, both of which can be deposited by electron beam physical vapor deposition. The thickness of the Fe layer can be, for example, about 1 nm, and the thickness of the $Al_2O_3$ layer can be, for example, about 10 nm. In some examples, the catalyst layer 230 can be patterned via, for example, lithography. The pattern of the catalyst layer 230 can be substantially similar to the desired pattern of the carbon nanotubes (CNTs) or metal nanowires to be grown on the catalyst. For example, the catalyst layer 230 can include a periodic 2D array. The pitch of the array can be, for example, about 1 µm to about 100 µm (e.g., about 1 µm, about 2 µm, about 3 µm, about 5 µm, about 10 µm, about 20 µm, about 30 µm, about 50 µm, about 100 µm, including any values and sub ranges in between).

FIG. 2D shows that a conductive porous medium 240 is formed. As illustrated in FIG. 2D, the conductive porous medium 240 includes vertically aligned CNTs 240 that are grown as a continuous layer or a group of microstructures via, for example, CVD process at atmospheric pressure. The CNTs 240 preferably grow on the catalyst sections on the conductive layer 220. Therefore, the pattern of the CNTs 240 can be controlled by the pattern of the catalyst layer 230. The height of the CNTs 240 can be about 0.2 µm to about 1000 µm (e.g., about 0.2 µm, about 0.5 µm, about 1 µm, about 2 µm, about 5 µm, about 10 µm, about 20 µm, about 30 µm, about 50 µm, about 100 µm, about 200 µm, about 300 µm, about 500 µm, or about 1000 µm, including any values and sub ranges in between). This height can be controlled by the growth time and/or the growth rate of the CVD process. In some examples, the growth rate can be about 10 µm/s to about 200 µm/s (e.g., about 10 µm/s, about 20 µm/s, about 50 µm/s, about 80 µm/s, about 150 µm/s, or about 200 µm/s, including any values and sub ranges in between).

In some examples, the substrate 210 deposited with the catalyst layer 230 can be placed in a quartz tube furnace for the CNT growth. The growth procedure can start with flowing of $He/H_2$ (e.g., at about 100/400 s.c.c.m.) while heating the furnace to a first elevated temperature (e.g., up to 775° C. over a 10-min ramp). The furnace can then be held at the first elevated temperature (e.g., about 775° C.) for an elongated time duration (e.g., about 10 min) with the same gas flow rates for annealing. Then the gas flow can be changed to a mixture of $C_2H_4/He/H_2$ (e.g., at 100/400/100 s.c.c.m.) at the first elevated temperature (e.g., about 775° C.) for CNT growth. The growth time can be selected to control the height (or length) of the CNTs 240. In some implementations, the typical growth rate can be about 100 µm/min. After the growth, the furnace can be cooled down to a second temperature (e.g., less than 100° C.) at the same gas flow and finally purged with He (e.g., at about 1,000 s.c.c.m. for about 5 min).

In FIG. 2E, a dielectric layer 250 is conformally coated on the CNTs 240 (including the outer surfaces of the side walls of the CNTs 240) to form a nanocomposite foamed surface 270. The CNTs 240 and the dielectric layer 250 form a forest of dielectric-coated CNTs 260 the conductive layer 220. In one example, the dielectric layer 250 includes ceramic (e.g., $Al_2O_3$) and can be coated via atomic layer deposition (ALD). In another example, the dielectric layer 250 includes polymer, such as p(PFDA), and can be coated via initiated Chemical Vapor Deposition (iCVD). In some examples, the coating material can be hydrophobic. In some other examples, the coating material can be hydrophilic.

For conformal polymer coating, iCVD polymerization can be carried out in a cylindrical reactor (e.g., diameter of about 24.6 cm and height of about 3.8 cm) with an array of 14 parallel chromoalloy filaments (e.g., from Goodfellow) suspended about 2 cm from the stage. The reactor can be covered with a quartz top (e.g., about 2.5 cm thick) that allows real-time thickness monitoring. For example, the thickness of the polymer coating can be monitored by reflecting a laser beam (e.g., 633 nm He—Ne laser beam) off the substrate/polymer and recording the interference signal intensity as a function of time.

The reactor can be pumped down by a mechanical Fomblin pump and the pressure can be monitored with a vacuum gauge (e.g., a MKS capacitive gauge). The liquid monomer can include (e.g., 1H, 1H, 2H, 2H-perfluorodecyl acrylate, PFDA, 97% Aldrich) and the initiator (e.g., tert-butyl peroxide, tributylphosphine oxide (TBPO), 98% Aldrich) can be used as received without further purification. TBPO can be kept at room temperature (e.g., about 25° C.) and can be delivered into the reactor through a mass flow controller (e.g., 1479 MFC, from MKS Instruments) at a constant flow rate (e.g., about 1 s.c.c.m. in process A, about 3 s.c.c.m. and 1 s.c.c.m. in DVB and PFDA polymerization during process B, respectively). Initiator radicals (TBO) can be created by breaking only the labile peroxide bond of the TBPO at filament temperature of about 250° C. during iCVD polymerization. The PFDA monomer can be vaporized in glass jars heated to 80° C. and then introduced to the reactor through needle valves at constant flow rates (e.g., about 0.2 s.c.c.m.).

The substrate temperature can be kept at Ts=30° C. (within±1° C.) using a recirculating chiller/heater (NESLAB RTE-7). All of the temperatures can be measured by K-type thermocouples (e.g., from Omega Engineering). The working pressure can be maintained at 60 mTorr using a throttle valve (e.g., from MKS Instruments). At the end, an ultrathin layer of pPFDA (approximately 30 nm thick) can be deposited within a 25 minute deposition time. The thickness of the pPFDA, deposited on to a control silicon substrate during iCVD polymerization, can be also measured using ellipsometry.

FIG. 2F shows a micrograph of the dielectric-coated CNTs 260. FIG. 2G shows, for an example, a magnified view of the top section of the dielectric-coated CNTs 260 (about top 10% of the dielectric-coated CNTs 260). It can be seen that the top section of the dielectric-coated CNTs 260 is in general highly porous (e.g., porosity greater than 90%). The high porosity can result in mechanical compliance (e.g., modulus of about 2 MPa to about 200 MPa) under compression, even after coating with the dielectric layer 250 and low adhesion (0.5 kPa or lower).

In some examples, the method 200 can further include some additional steps. For example, a plasma treatment can be performed after the growth of the CNTs 240 shown in FIG. 2D. During the CNT growth, a top surface (i.e., surface distal to the substrate 210) of the CNTs 240 may include tangled CNT fibers that can result in a dense cluster layer. Plasma etching can be performed to remove at least some of the top cluster layer. In some examples, the plasma etching can use oxygen plasma, in which the CVD grown CNTs 240 can be exposed to the oxygen plasma with 80/20 of $Ar/O_2$ gas flow for 5 min at 50 W and 200 mTorr pressure using a Plasma system. The plasma treatment may etch both the top and sidewalls of the CNTs, thereby slightly narrowing their width. Therefore, this reduction can be taken into account when designing the CNT growth patterns to achieve a desired tool dimension.

In some examples, the method 200 can further include plasma treatment on the dielectric layer 250. In addition to functioning as an insulation layer, the dielectric layer 250 can also be configured to bond some of the CNTs 240 together to improve the mechanical strength in the resulting tool 270. The additional plasma treatment can remove any extraneous material from the bonding.

In some embodiments, the mechanical behavior of the nanocomposite foamed surface 270 can be similar to that of open-cell foams when compressed to moderate strains. The modulus of the nanocomposite foamed surface 270 can be tuned over a wide range based on the diameter, density, and connectivity of the nanowires or nanoparticles 240.

FIGS. 3A-3G illustrate a method 300 of fabricating a nanocomposite foamed surface using CNTs transferred from a separate substrate. The nanocomposite foamed surface can be used in the apparatus shown in FIGS. 1A and 1B. In the method 300, a growth substrate 315 is coated with a catalyst layer 325 to grow CNTs 340 via CVD, as illustrated in FIGS. 3A-3C. Separately, a tool substrate 310 is coated with a conductive layer 320 (e.g. TiN or gold) as shown in FIGS. 3D and 3E. In FIG. 3F, the CNTs 340 are transferred from the growth substrate 315 to the conductive layer 320 disposed on the tool substrate 310. In FIG. 3G, a dielectric layer 350 is conformally deposited on the CNTs 340 to form a forest of dielectric-coated CNTs 360, thereby forming a nanoporous electrostatic tool 370 that can be used for object manipulation.

The CNTs 340 can be transferred from the growth substrate 315 to the conductive layer 320 disposed on the tool substrate 310 via various techniques. For example, the CNTs 340 can be transferred to the conductive layer 320 by a polydimethylsiloxane (PDMS) handle layer. More specifically, a PDMS film can be gently compressed on the CNTs 340, then the CNTs 340 can be delaminated from the growth substrate 315 as the PDMS film is peeled off rapidly. Next, the combination of the CNTs 340 and the PDMS can be placed on the conductive layer 320, followed by peeling off PDMS slowly to remove the PDMS, thereby leaving the CNTs 340 standing on the conductive layer 320.

In another example, the CNTs 340 can be transferred to the conductive layer 320 by first depositing a metal film (e.g. Au) on top of the CNTs 340 via physical vapor deposition methods, followed by pressing against the conductive layer at an elevated temperature. The metal film and conductive layer can thermally sintered allowing CNTs to be delaminated from the growth substrate 315.

In another example, the CNTs 340 can be removed from the growth substrate 315 by weak oxidation, resulting a freestanding CNT film. The CNT film can then be assembled onto the conductive layer 320 for further treatment, such as dielectric coating.

Characterization of Nanocomposite Foamed Surfaces

FIG. 4A shows a schematic of a system 400 to characterize the mechanical compliance and surface adhesion of a nanocomposite foam 430 (including CNT forests) disposed on a substrate 420. In this system 400, a conductive probe 410 is pressed against (or pulled over away from) the CNT forest 430. The load force P is then measured against the displacement 8 of the tip of the probe 410.

FIG. 4B shows the measured load force versus the displacement (surface stiffness) and FIG. 4C shows a magnified view of the measurement in the region when the probe and the surface are physically detached. It can be clearly seen that a negative pull-off force was observed when the probe 410 is pulled away from the CNT forest 430, indicating an adhesion force between the nanocomposite foam 430 and the probe 410.

Figure 5A:
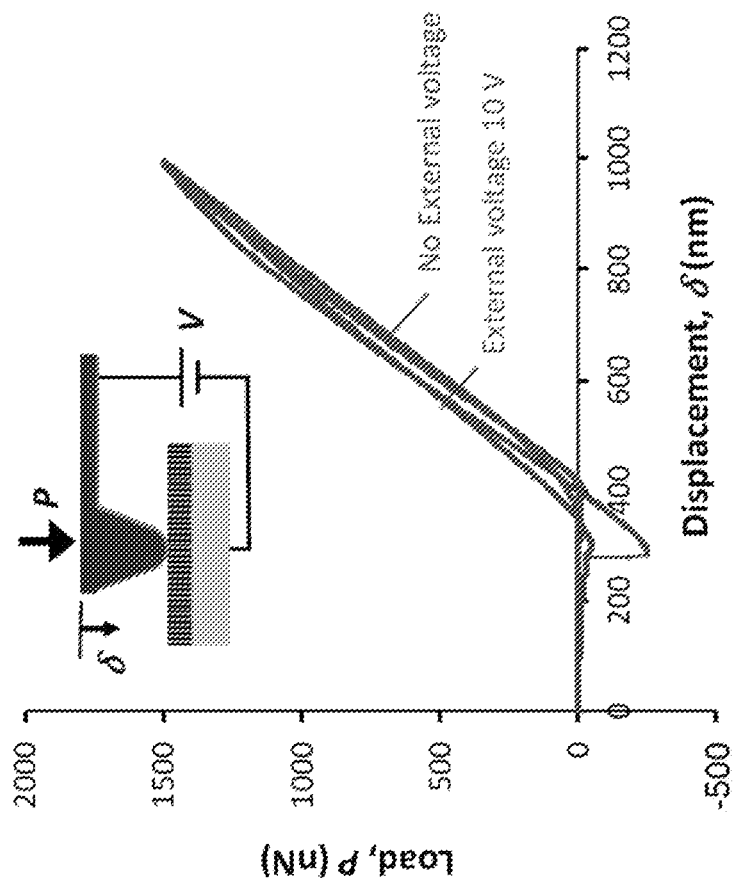
FIG. 5A and 5B show contact of dielectric-coated conductive surfaces with and without CNT forests, respectively, against a micrometer scale sphere.
Figure 5B:
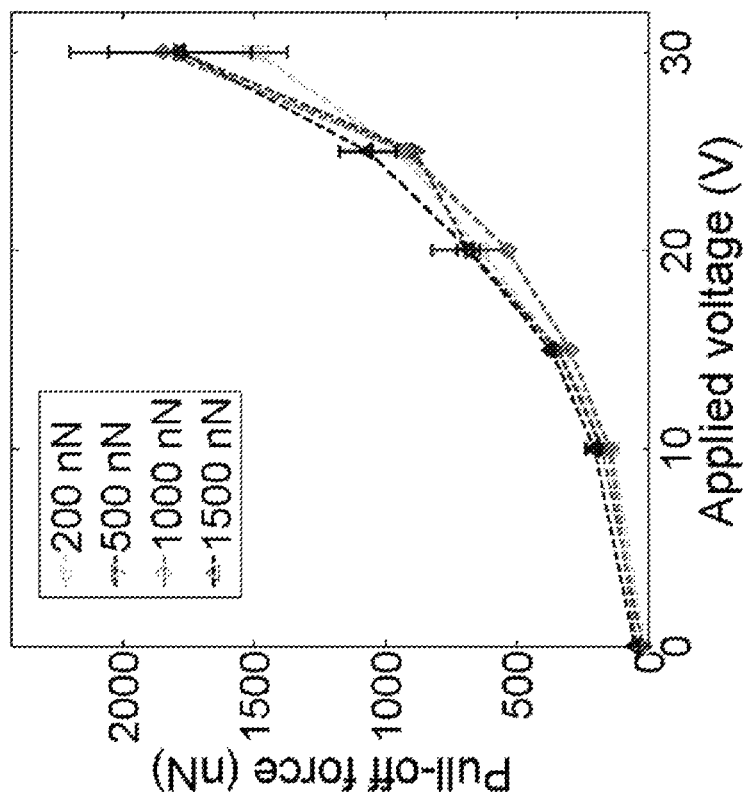

FIG. 5A shows measured load force versus displacement of a forest of dielectric-coated CNTs with and without applied voltages. FIG. 5B shows measured pull-off force versus applied voltages of a CNT forest coated with a dielectric layer. Different pre-load forces are used in the characterization. With a thin, uniform dielectric layer coated on the CNTs, charges can be induced between the CNTs and the target surface by applying a bias voltage, thereby tuning the adhesion based on electrostatic attraction. FIG. 5A shows that by applying a voltage at 10 V on the CNT forest, the pull-off force (indicated by the portion of the curve below the x axis) is noticeably increased. FIG. 5B shows that with less than 30 V of voltage, the resulting adhesion (as manifested by the pull-off force) can be adjusted within a large range between about 20 nN and about 2000 nN. Quantitative measurement shows that the adhesion scales with square of bias voltage.

Figure 6C:
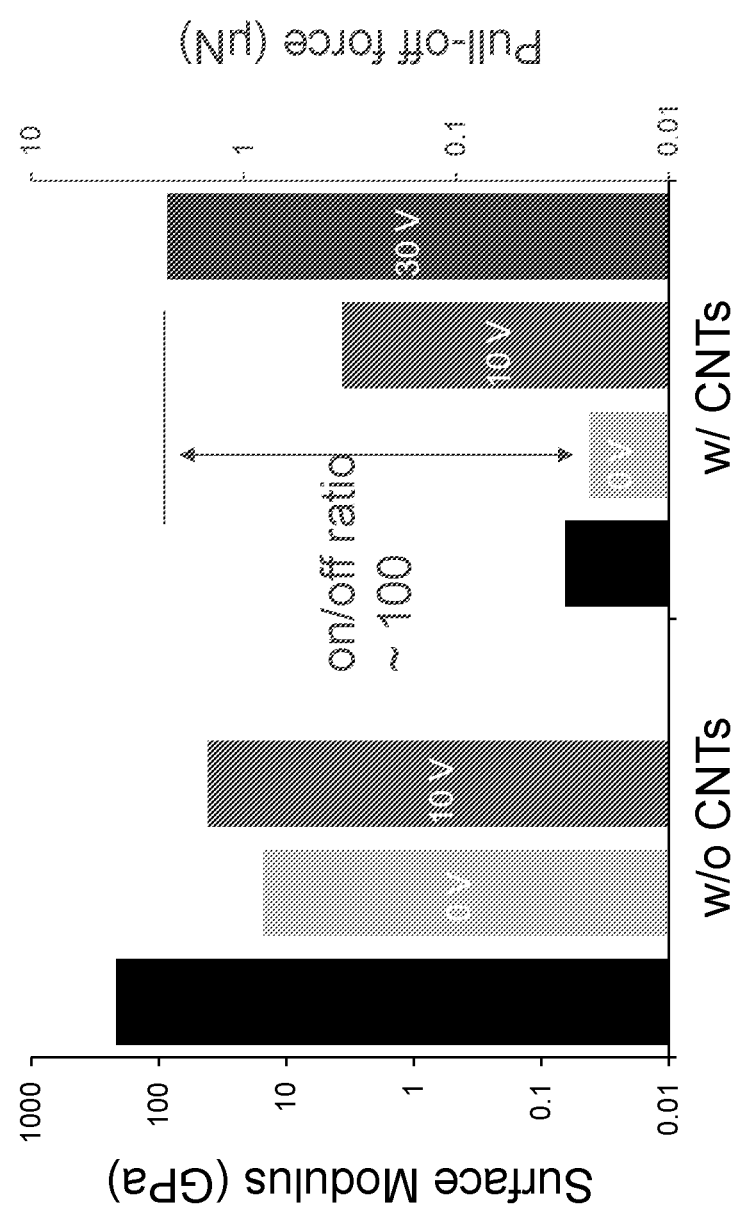

FIGS. 6A-6C illustrate the effects of CNT forests on the surface moduli and pull-off forces in electrostatic tools. FIGS. 6A and 6B show schematics of the setup 600 for the characterization. The setup 600 includes a conductive microsphere 620 that is placed on two electrostatic tools 610a and 610b. The first electrostatic tool 610a includes a CNT forest coated with a dielectric layer (e.g., $Al_2O_3$), while the second electrostatic tool 610b includes a dielectric layer coated on a flat conductive surface.

FIG. 6C shows surface modulus and pull-off force in two tools 610a and 610b. The surface modulus of the first tool 610a having the nanocomposite foam (about 0.03 GPa) is more than $10^3$-fold lower than that of the second tool 610 having a solid dielectric-conductive surface without the nanofoam (about 150 GPa). In addition, the adhesion force of the first tool 610a having the nanocomposite foam (about 0.015 µN) is about 40-fold lower than that of the second tool 610b having the solid dielectric-conductive surface without the nanofoam (about 0.8 µN). When an external voltage is applied between the conductive microsphere and the conductive layer, the adhesion force of the first tool 610a having the nanocomposite foam increases dramatically to about 2 µN at 10 V and about 15 µN at 30 V, which is 100 times greater than that at 0 V. These results show that having the conductive nanoporous foam (e.g. CNT forests) on the conductive layer coated with thin dielectric can create mechanical compliance and low adhesion (without voltage), and the adhesion can be adjusted within a large range (about 100 or greater on/off ratio) by applying external voltages.

Figure 7B:
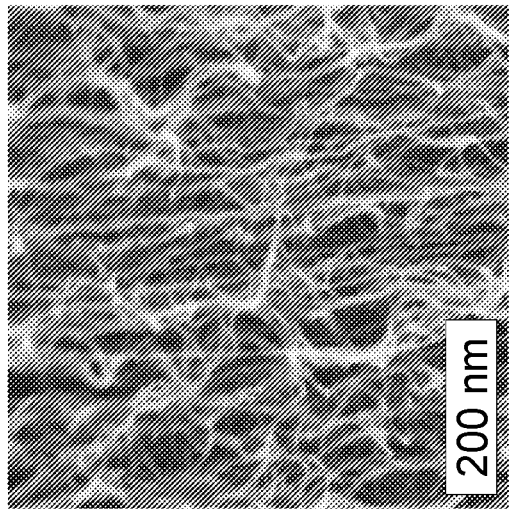
FIGS. 7A and 7B show scanning electron microscope (SEM) images of CNT forests having a high density and a low density, respectively.
Figure 7A:
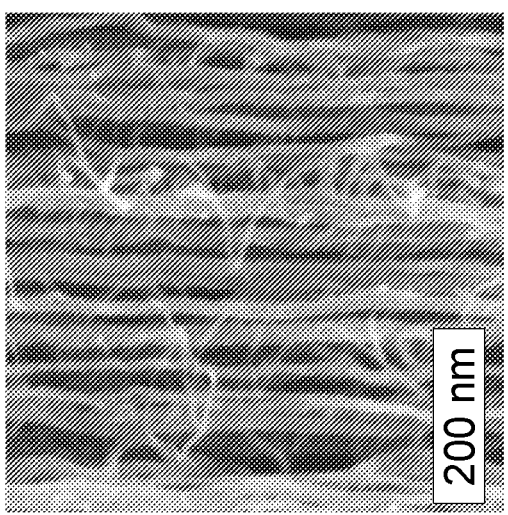
Figure 7C:
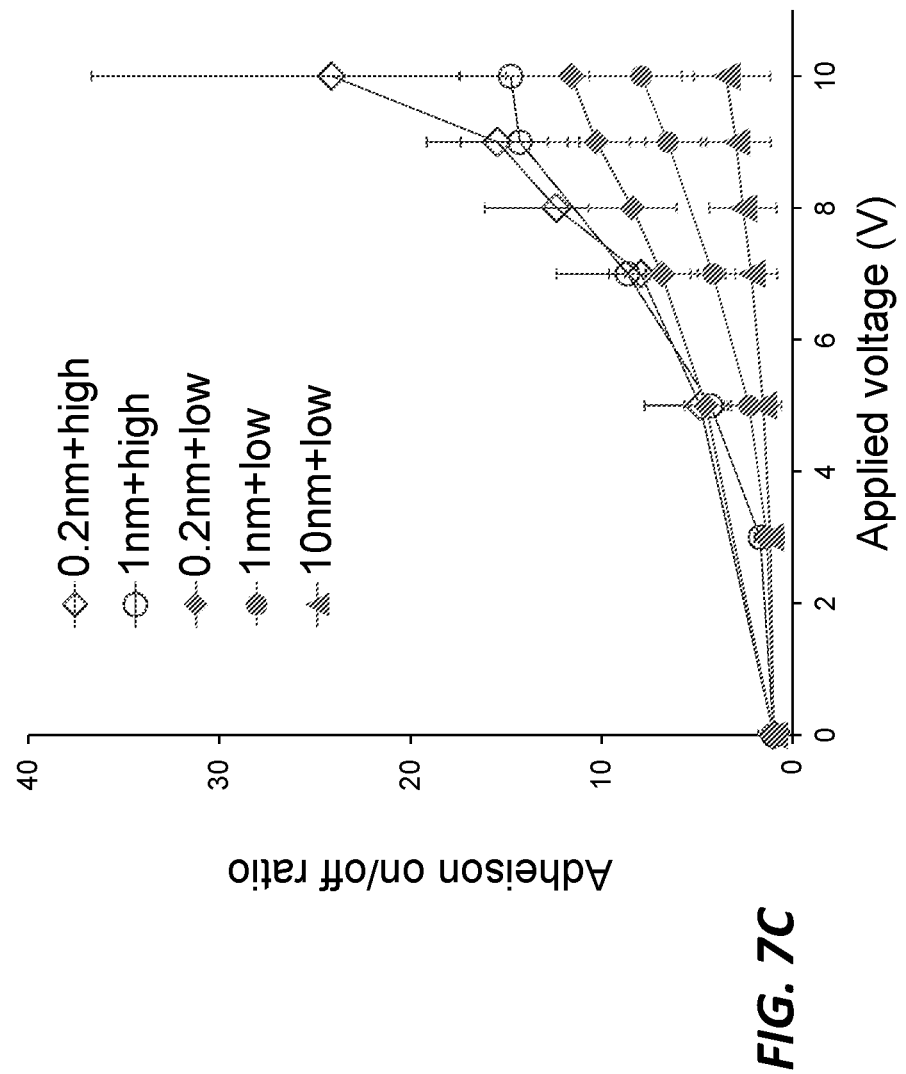
FIG. 7C shows on/off ratio of the adhesion forces of the CNT forests shown in FIGS. 7A and 7B.

Electrostatic attraction force of the nanocomposite foamed can depend on the density the nanocomposite foam (i.e. number of CNTs within a given area) and the thickness of the dielectric coating. FIG. 7A and 7B show nanoporous foams of aligned CNTs with different volumetric densities (about 1% and about 10%, respectively). FIG. 7C shows the adhesion on/off ratio versus applied voltages of alumina coated CNTs with different densities and coating thickness (about 0.2 nm, about 1 nm, and about 10 nm). Higher density and thinner coating thickness can induce higher electrostatic attraction force and accordingly higher adhesion on/off ratio.

Methods of Object Manipulation using Nanocomposite Foamed Surfaces

Figure 8:
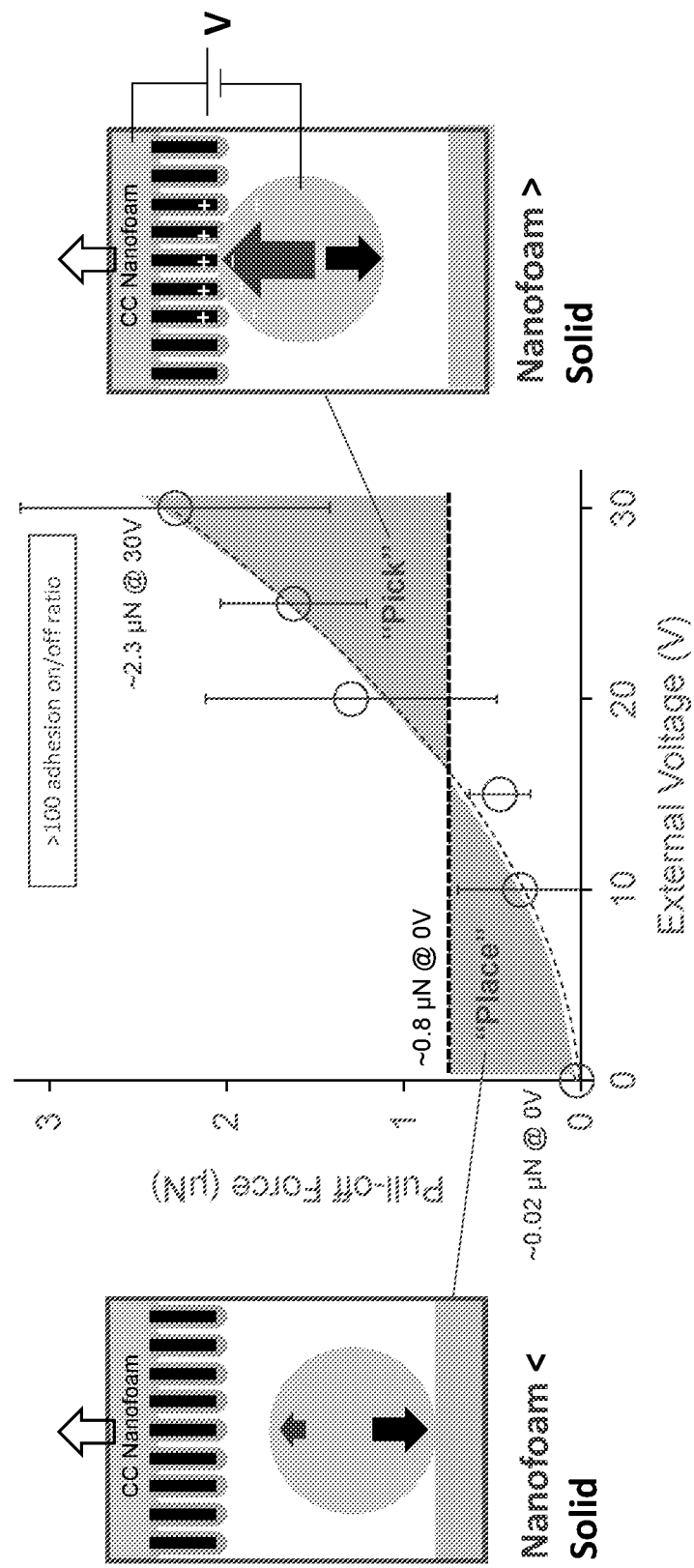
FIG. 8 illustrates a pick-and-place operation using apparatus shown in FIGS. 1A and 1B.

FIG. 8 illustrates an example of object manipulation using a nanocomposite foamed surface with electrically tunable adhesion. The illustration is based on characterized plot of pull-off force versus applied voltage. When a high voltage is applied to the nanocomposite foamed surface, the adhesion between the nanocomposite foamed surface and the object can be greater than that between the object and the supporting solid surface. Therefore, the nanocomposite foamed surface can pick up the object from the solid surface. If the size of the object is greater than 100 µm, then the adhesion between the nanocomposite foamed surface and the object at high voltage can be greater than the weight of the object in addition to the adhesion between the object and the supporting solid surface, in order to pick up the object.

When the voltage is turned off (e.g. grounded) or a low voltage is applied, the adhesion between the nanocomposite foamed surface and the object can be lower than that between the object and the target surface (i.e. where the object is to be placed). Therefore, the nanocomposite foamed surface can place the object to the target surface. If the size of the object is greater than 100 µm, the object can be easily placed when the adhesion between the nanocomposite foamed surface and the object at low voltages becomes smaller than the weight of the object in addition to the adhesion between the object and the target surface.

FIGS. 9A-9D illustrate a method of object manipulation (e.g., pick-and-place operation) using a nanoporous electrostatic tool 910 including a nanocomposite foam (and can be similar to the apparatus shown in FIGS. 1A and 1B). The method 900 starts with the tool including a dielectric-coated porous medium 916 (e.g. dielectric-coated CNTs or other conductive fibers) disposed on a conductive layer 914 coated on a substrate 912, as illustrated in FIG. 9A. FIG. 9A also shows three objects 920a, 920b, and 920c (collectively referred to as objects 920) disposed on a substrate 930 for manipulation. The objects 920 have different shapes and surface to illustrate the versatility of the tool 910. The size of the objects 920 can be about 2 mm or smaller.

In FIG. 9B, the tool 910 is pressed against the objects 920 with a load force 901. As the the dielectric-coated porous medium 916 is compliant, the tool 910 enables conformal contact against the objects 920 having rough surfaces or complex structures. The compliance can also achieve a good contact on delicate parts by compression without causing damages. Depending on the weight and/or shape of the objects 920, the load force 901 can be greater than about 0.1 kPa and less than about 1 MPa and/or greater than 1 kPa and less than 175 kPa. In some implementations, the pressure applied is: less than than 150 kPa, less than 125 kPa, less than 100 kPa, less than 75 kPa, less than 50 kPa, less than 40 kPa, less than 30 kPa, less than 20 kPa, less than 15 kPa, less than 10 kPa, less than 9 kPa, less than 8 kPa, less than 7 kPa, less than 6 kPa, less than 5 kPa, less than 4 kPa, less than 3 kPa, or less than 2 kPa.

FIG. 9C shows that an external voltage is applied between the conductive layer 914 and the objects 920 to increase the adhesion force based on electrostatic force. The resulting adhesion force can be strong enough such that the objects 920 can be lifted away from the substrate 930 by lifting the tool 910. After locating the tool 910 to the desired location on a target substrate 940 (or any other surface) where the objects 920 can be placed, the electrostatic force can be turned off, leaving the objects 920 on the target substrate 940.

In one example, the objects 920 can be released onto the target substrate 940 from above the target substrate 940, i.e. the objects 920 fall onto the desired locations on the target substrate 940. In another example, the tool 910 can place the objects 920 in contact with the target substrate 940 before the voltage is removed. The contact between the objects 920 and the target substrate 940 may create adhesion force (not based on electrostatic force) that facilitate the release when the tool 910 is moving away from the target substrate 940.

FIGS. 9C and 9D show that the three objects 920a, 920b, and 920c are picked up and placed on the target substrate 940 at the same time. In operation, however, each object can be picked up and placed individually. For example, the tool 910 can include multiple (e.g., three or more) sections, each of which has its own electrode and subset of nanocomposite foams to form a separate (e.g., separately controllable) nanocomposite foam. This allows the flexibility to pick up any one or more of multiple objects from different places and place them onto different places as well.

With reference again to FIG. 9A, in some examples, the conductive layer 914 in the tool 910 can include a 2D array of electrodes, each of which is underneath a corresponding section of the dielectric-coated pours medium 916 (e.g., a group of dielectric-coated CNTs) to form a manipulation pixel (also referred to as a pixel). In operation, each pixel can be controlled separately from other pixels, i.e. turning the electrostatic force on and off. As a result, the tool 910 can pick up one object using one subset of pixels and pick up another object using another subset of pixels. Similar control can be used in the release operation as well, i.e., placing one object by removing the voltage applied on one subset of pixels and placing another object by removing the voltage applied on another subset of pixels. In some examples, the size of each pixel can be, for example, about 100 nm to about 100 μm (e.g., about 100 nm, about 200 nm, about 300 nm, about 500 nm, about 1 μm, about 2 μm, about 3 μm, about 5 μm, about 10 μm, about 20 μm, about 30 μm, about 50 μm, or about 100 μm, including any values and sub ranges in between).

In other examples, the dielectric-coated porous medium 916 in the tool 910 can include a 2D pattern. The patterned nanocomposite foamed surfaces can pick up multiple particles selectively from a pre-formed particle layer, and place the particles to a target substrate replicating the 2D pattern.

FIGS. 10A and 10B illustrate a method 1000 to manipulate a conductive object 1020 by applying a voltage between a nanoporous electrostatic tool 1010 and the conductive object 1020. FIG. 10A shows a schematic of the setup and FIG. 10B shows a magnified view of the region at the tool-object interface. In this method 1000, the tool 1010 includes a forest of dielectric-coated CNTs 1016 (also referred to as the CNT forest 1016) disposed on a conductive layer 1014 that is coated on a substrate 1012. The conductive object 1020 is placed on a substrate 1030 ready for being picked up.

In operation, the conductive layer 1014 of the tool 1010 is connected to the positive terminal of a power source 1040, and the conductive object 1020 is connected to the negative terminal of the power source 1040. As a result, positive charges 1050a accumulate on the CNT forest 1016 and negative charges accumulate on the surface 1022 of the conductive object 1020, as illustrated in FIG. 10B. In some examples, the conductive layer 1014 can be connected to the negative terminal of the power source 1040, while the conductive object 1020 can be connected to the positive terminal of the power source 1040.

FIG. 10B also illustrates a conformal contact between the CNT forest 1016 and the surface 1022 of the conductive object 1020. The surface 1022 may have nanoscale roughness (or irregularities). The top section of the CNT forest 1016 can bend accordingly upon contacting the surface 1022 to create the conformal contact, which in turn can increase the electrostatic adhesion force. As illustrated in FIG. 10B, the surface 1022 of the conductive object 1020 contacts not only the tip of the CNTs but also the side walls of the CNTs to increase the contact area. Although FIG. 10B illustrates a conducive object 1020 for manipulation, in operation, similar conformal contact occurs for non-conductive objects as well.

Figures 11, 12:
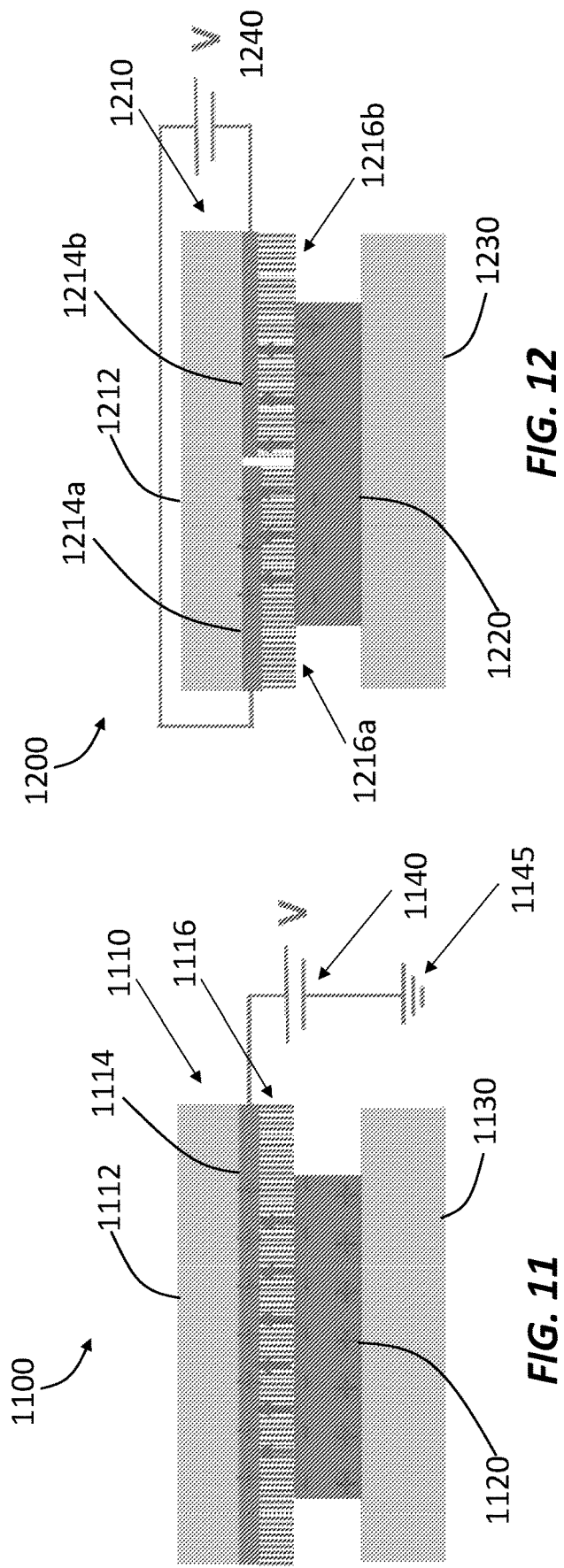
FIG. 11 illustrates a method of object manipulation by applying a voltage between a nanoporous electrostatic tool and the ground.
FIG. 12 illustrates a method of object manipulation by applying a voltage between different sections of a nanoporous electrostatic tool.

FIG. 11 illustrates a method 1100 of object manipulation by applying a voltage between a nanoporous electrostatic tool 1110 and the ground 1145. In this method 1100, the tool 1110 includes a dielectric-coated CNT forest 1116 disposed on a conductive layer 1114, which in turn is disposed on a substrate 1112. An object 1120 (conductive or non-conductive) is disposed on a substrate 1130 for manipulation. The conductive layer 1114 is connected to the positive terminal of a power source 1140, which has its negative terminal connected to the ground 1145. In this manner, positive charges accumulate on the tool 1110 and negative charges accumulate on the top surface (i.e. the surface in contact with the tool 1110) of the object 1120, resulting in an electrostatic force to adhere the object 1120 to the tool 1110.

FIG. 12 illustrates a method 1200 of object manipulation by applying a voltage between different sections of a nanoporous electrostatic tool 1210. In this method 1200, the tool 1210 includes a first group of CNTs 1216a and a second group of CNTs 1216b. The first group of CNTs 1216 is disposed on a first electrode 1214a and the second group of CNTs is disposed on a second electrodes 1214b. The two electrodes 1214a and 1214b are disposed on a common substrate 1212. An object 1220 (conductive or non-conductive) is disposed on a substrate 1230 for manipulation.

In operation, a power source 1240 is used to apply a voltage between the first group of CNTs 1216a and the second group of CNTs 1216b. For example, the first group of CNTs 1216a is connected to the positive terminal of the power source 1240 and the second group of CNTs 1216b is connected to the negative terminal of the power source 1240. As a result, positive charges accumulate on the first group of CNTs 1216a and negative charges accumulate on the portion of the object 1220 in contact with the CNTs 1216a. Similarly, negative charges accumulate on the second group of CNTs 1216b and positive charges accumulate on the portion of the object 1220 in contact with the CNTs 1216b.

FIG. 12 shows that the tool 1220 has two sections for illustrative purposes only. In operation, the tool 1220 can have any other number of sections. For example, the tool 1220 can include an array of interdigitated electrodes and adjacent electrodes are connected to opposite terminals of a power source. In another example, the tool 1220 can include a 2D array of electrodes, each of which is used to apply a voltage onto a group of CNTs. Adjacent electrodes in the 2D array of electrodes can be connected to opposite terminals of a power source. Alternatively, adjacent rows (or columns) of electrodes can be connected to opposite terminals of a power source.

Figure 13:
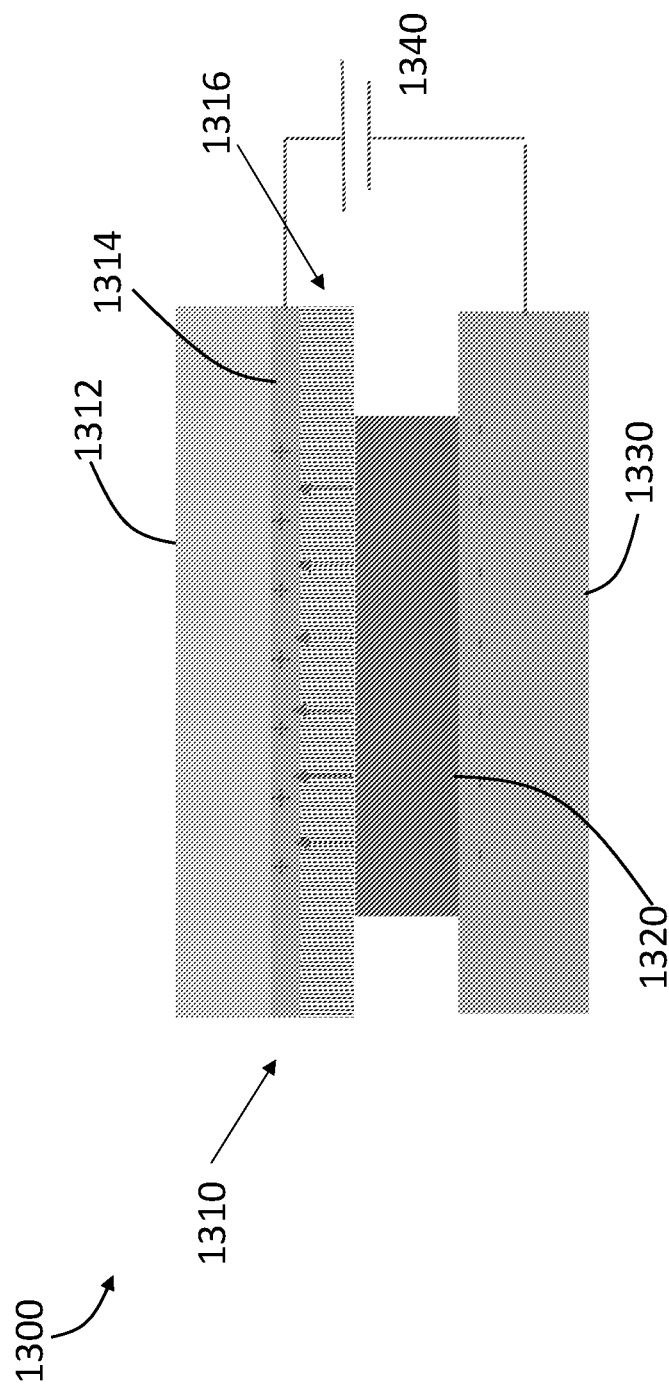
FIG. 13 illustrates a method of object manipulation by applying a voltage between a nanoporous electrostatic tool and a holding substrate.

FIG. 13 illustrates a method 1300 of object manipulation by applying a voltage between a nanoporous electrostatic tool 1310 and a holding substrate 1330 that holds a target object 1320. In this method 1300, the tool 1310 includes a dielectric-coated CNT forest 1316 disposed on a conductive layer 1314, which in turn is disposed on a substrate 1312. A power source 1340 has one terminal connected to the conductive layer 1314 in the tool 1310 and the other terminal connected to the holding substrate 1330, thereby creating the electrostatic force between the tool 1310 and the target object 1320.

FIGS. 9A-13 illustrate object manipulation methods using CNT forest as an example. In practice, any other microstructures described herein can also be used. The methods illustrated in FIGS. 9A-12 using CNT forest or any other microstructures can be used for various applications. In one example, these methods can be used for microelectronics assembly, such as assembling radio frequency identification (RFID) components. In RFID technology, the size of a microchip with integrated circuits is becoming smaller than 500 µm. The manipulations methods described herein can be employed to assemble such small chip to printed antennas, interconnections, and other circuit components to form an RFID tag. In some examples, the methods can be used to assemble micro LEDs to manufacture displays. In high-resolution display manufacturing, each LED pixel can be on the order of micrometers or even smaller. Picking and placing these pixels can be carried out using the methods described herein. In other examples, the methods described herein can be used to manipulate biological samples so as to place them under microscopic system for imaging.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for manipulating an object, the apparatus comprising:
   a substrate;
   an electrically conductive layer disposed on the substrate;
   a porous medium disposed on the electrically conductive layer, the porous medium disposed on the electrically conductive layer, the porous medium comprising an electrically conductive material; and
   a dielectric layer conformally disposed on the porous medium to insulate the porous medium from the object during use,
   wherein:
   a porosity of the porous medium is about 90% or greater;
   an adhesive strength of the porous medium is about 1 kPa or lower; and
   a modulus of the porous medium is about 1 GPa or lower.

2. The apparatus of claim 1, wherein the porous medium comprises a plurality of carbon nanotubes.

3. The apparatus of claim 1, wherein the porous medium comprises a plurality of metal nanowires.

4. The apparatus of claim 1, wherein the porous medium comprises a plurality of aligned carbon nanotubes.

5. The apparatus of claim 1, wherein the porous medium comprises a plurality of aligned metal nanowires.

6. The apparatus of claim 1, wherein the porous medium comprises a plurality of vertically aligned carbon nanotubes.

7. The apparatus of claim 1, wherein the porous medium comprises a plurality of vertically aligned metal nanowires.

8. The apparatus of claim 1, wherein the porous medium comprises a plurality of conductive fibers, each conductive fiber in the plurality of conductive fibers having a diameter of about 1 nm to about 1 μm and a length of about 100 nm to about 1 mm.

9. The apparatus of claim 1, wherein the porous medium comprises at least one of carbon-based aerogels, metal aerogels, or metal-oxide aerogels.

10. The apparatus of claim 1, wherein the porous medium has an average void size of about 1 nm to about 1 μm.

11. The apparatus of claim 1, wherein the dielectric layer includes ceramic or polymer.

12. The apparatus of claim 1, wherein the dielectric layer has a thickness of about 0.1 nm to about 50 nm.

13. The apparatus of claim 1, wherein the conductive layer comprises at least one of a metal, an electrically conductive ceramic, or an electrically conductive polymer.

14. The apparatus of claim 1, wherein the conductive layer comprises a plurality of discrete conductive sublayers forming a two-dimensional (2D) pattern disposed on the substrate, the porous medium comprising a plurality of microstructures, each microstructure disposing on a corresponding conductive sublayer in the plurality of discrete conductive sublayers.

15. The apparatus of claim 1, wherein the porous medium comprises a plurality of discrete porous microstructures forming a 2D pattern disposed on the conductive layer.

16. The apparatus of claim 1, further comprising:
   a voltage source having a first terminal electrically connected to the conductive layer and a second terminal electrically connected to the object during use so as to create an electrostatic force between the apparatus and the object.

17. The apparatus of claim 1, wherein the porous medium comprises a plurality of conductive fibers, the conductive layer includes a first electrode disposed underneath a first subset of conductive fibers and a second electrode disposed underneath a second subset of conductive fibers, and the apparatus further comprises:
   a voltage source having a first terminal electrically connected to the first electrode and a second terminal electrically connected to the second electrode.

18. The apparatus of claim 1, further comprising:
   a voltage source having a first terminal electrically connected to the conductive layer and a second terminal connected to the ground.

19. The apparatus of claim 1, further comprising:
   a voltage source having a first terminal electrically connected to the conductive layer and a second terminal electrically connected to a surface holding the object.

20. The apparatus of claim 1, wherein the adhesion strength of the porous medium with an applied voltage of about 0.1 V or greater is about 1 kPa or greater.

21. The apparatus of claim 1, wherein the dielectric layer is disposed on a portion of a surface of the electrically conductive layer that is not covered by the porous medium.

22. The apparatus of claim 1, wherein at least a portion of the dielectric layer is disposed on the electrically conductive medium.

23. An apparatus for manipulating an object, the apparatus comprising:
a substrate;
a conductive layer comprising TiN and disposed on the substrate;
a plurality of vertically aligned carbon nanotubes disposed on the conductive layer and having a porosity of about 90% or greater at a top section of the plurality of carbon nanotubes, each carbon nanotube in the plurality of vertically aligned carbon nanotubes having a diameter of about 1 nm to about 100 nm;
a dielectric layer conformally disposed on the plurality of vertically aligned carbon nanotubes and configured to insulate the plurality of vertically aligned carbon nanotubes from the object during use, the dielectric layer having a thickness of about 10 nm or less; and
a voltage source electrically coupled to the conductive layer and configured to generate an electrostatic force between the plurality of vertically aligned carbon nanotubes and the object during use,
wherein a modulus of the vertically aligned carbon nanotubes is about 2 MPa to about 200 MPa, and an adhesive strength is adjustable between about 0.5 kPa and about 50 kPa when an voltage applied on the plurality of vertically aligned carbon nanotubes is between about 0 V and about 30 V.

24. A method of manipulating an object, the method comprising:
contacting a top section of a dielectric-coated porous medium against the object, the dielectric-coated porous medium comprising a conductive porous medium conformally coated with a dielectric layer;
applying a voltage on the dielectric-coated porous medium so as to adhere the object to the dielectric-coated porous medium based at least in part on electrostatic force; and
removing the voltage so as to release the object from the dielectric-coated porous medium onto a target substrate,
wherein the dielectric-coated porous medium has a porosity of about 90% or greater,
wherein an adhesive strength of the dielectric-coated porous medium is about 1 kPa or lower, and
wherein the dielectric-coated porous medium has a modulus of about 1 GPa or lower.

25. The method of claim 24, wherein the dielectric-coated porous medium has an adhesive strength of about 0.5 kPa or lower without the voltage, and the adhesive strength is about 1 kPa or greater when the voltage is about 0.1 V or greater.

26. The method of claim 24, wherein the conductive porous medium comprises a plurality of conductive fibers.

27. The method of claim 24, wherein the conductive porous medium comprises a plurality of carbon nanotubes.

28. The method of claim 24, wherein the conductive porous medium comprises a plurality of metal nanowires.

29. The method of claim 24, wherein the conductive porous medium comprises a plurality of conductive fibers, each conductive fiber in the plurality of conductive fibers having a diameter of about 1 nm to about 100 nm and a length of about 100 nm to about 1 mm.

30. The method of claim 24, wherein the conductive porous medium comprises at least one of carbon-based aerogels, metal aerogels, or metal-oxide aerogels.

31. The method of claim 24, wherein the conductive porous medium has an average void size of about 1 nm to about 1 µm.

32. The method of claim 24, wherein the dielectric layer comprises ceramic or polymer.

33. The method of claim 24, wherein the dielectric layer has a thickness of about 0.1 nm to about 50 nm.

34. The method of claim 24, wherein the conductive layer comprises at least one of a metal, an electrically conductive ceramic, or an electrically conductive polymer.

35. The method of claim 24, wherein the object includes a conductive object, and applying the voltage comprises:
electrically connecting the conductive layer to a first terminal of a voltage source; and
electrically connecting the conductive object to a second terminal of the voltage source so as to create the electrostatic force between the dielectric-coated porous medium and the conductive object.

36. The method of claim 24, wherein applying the voltage comprises:
electrically connecting the conductive layer to a first terminal of a voltage source; and
electrically connecting a second terminal of a voltage source to ground so as to create the electrostatic force between the adhesive tool and the object.

37. The method of claim 24, wherein applying the voltage comprises:
applying the voltage between a first section of the dielectric-coated porous medium and a second section of the dielectric-coated porous medium.

38. The method of claim 24, wherein applying the voltage comprises:
electrically connecting the conductive layer to a first terminal of a voltage source; and
electrically connecting a supporting substrate holding the object to a second terminal of a voltage source so as to create the electrostatic force between the dielectric-coated porous medium and the object.

39. The method of claim 24, wherein applying the voltage comprises applying the voltage of about 0.1 V or greater.

40. The method of claim 24, wherein the object has a non-planar surface and contacting the top section of the dielectric-coated porous medium comprises forming a conformal contact between the top section of the dielectric-coated porous medium and the non-planar surface of the object.

* * * * *